(12) United States Patent
Boe et al.

(10) Patent No.: US 7,496,414 B2
(45) Date of Patent: Feb. 24, 2009

(54) DYNAMIC CONTROLLER UTILIZING A HYBRID MODEL

(75) Inventors: Eugene Boe, Austin, TX (US); Gregory D. Martin, Georgetown, TX (US); Stephen W. Piche, Austin, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 326 days.

(21) Appl. No.: 11/531,342

(22) Filed: Sep. 13, 2006

(65) Prior Publication Data

US 2008/0065241 A1    Mar. 13, 2008

(51) Int. Cl.
*G05B 17/00* (2006.01)
*G05B 13/04* (2006.01)

(52) U.S. Cl. .............. 700/44; 700/29; 700/37; 700/39; 703/2; 703/18

(58) Field of Classification Search .......... 700/29, 700/37, 39, 44; 703/2, 16, 23
See application file for complete search history.

(56) References Cited

U.S. PATENT DOCUMENTS

| | | | |
|---|---|---|---|
| 4,228,509 A | 10/1980 | Kennedy | |
| 4,230,534 A | 10/1980 | Stewart | |
| 4,349,869 A | 9/1982 | Prett et al. | |
| 4,358,822 A | 11/1982 | Sanchez | |
| 4,368,509 A | 1/1983 | Li | |
| 4,466,054 A | 8/1984 | Shigemasa et al. | |
| 4,549,123 A | 10/1985 | Hagglund et al. | |
| 4,628,462 A | 12/1986 | Putman | |

(Continued)

FOREIGN PATENT DOCUMENTS

EP    0 280 948 A1    7/1988

(Continued)

OTHER PUBLICATIONS

T. J. Graettinger, N. V. Bhat, K. Heckendorn and J. S. Buck; "Model Predictive Control Using Neural Networks"; AIChE; Apr. 1994; pp. 1-11.

(Continued)

*Primary Examiner*—Albert DeCady
*Assistant Examiner*—Douglas S Lee
(74) *Attorney, Agent, or Firm*—Fletcher Yoder; William R. Walbrun

(57) ABSTRACT

A system and method for predicting operation of a plant or process receive an input value from the plant or process. An integrity of a non-linear model corresponding to a local input space of the input value may be determined. The non-linear model may include an empirical representation of the plant or process. If the integrity is above a first threshold, non-linear model may be used to provide a first output value. However, if the integrity is below the first threshold, a linearized first principles model may be used to provide a second output value. The linearized first principles model may include an analytic representation of the plant or process. Additionally, the analytic representation of the plant or process may be independent of the empirical representation of the plant or process. The first output value and/or the second output value may be usable to manage the plant or process.

20 Claims, 20 Drawing Sheets

U.S. PATENT DOCUMENTS

| | | | |
|---|---|---|---|
| 4,639,853 | A | 1/1987 | Rake et al. |
| 4,663,703 | A | 5/1987 | Axelby et al. |
| 4,674,029 | A | 6/1987 | Maudal |
| 4,736,316 | A | 4/1988 | Wallman |
| 4,754,391 | A | 6/1988 | Suzuki |
| 4,769,766 | A | 9/1988 | Tung |
| 4,858,147 | A | 8/1989 | Conwell |
| 4,868,754 | A | 9/1989 | Matsumoto |
| 4,935,886 | A | 6/1990 | Choka |
| 4,965,713 | A | 10/1990 | Hong et al. |
| 5,091,843 | A | 2/1992 | Peczkowski |
| 5,111,531 | A | 5/1992 | Grayson et al. |
| 5,251,285 | A | 10/1993 | Inoue et al. |
| 5,268,834 | A | 12/1993 | Sanner et al. |
| 5,282,130 | A | 1/1994 | Molnar |
| 5,282,261 | A | 1/1994 | Skeirik |
| 5,283,729 | A | 2/1994 | Lloyd |
| 5,285,377 | A | 2/1994 | Sugasaka et al. |
| 5,305,230 | A | 4/1994 | Matsumoto et al. |
| 5,311,421 | A | 5/1994 | Nomura et al. |
| 5,335,164 | A | 8/1994 | Gough, Jr. et al. |
| 5,353,207 | A * | 10/1994 | Keeler et al. ............... 700/44 |
| 5,369,345 | A | 11/1994 | Phan et al. |
| 5,396,415 | A | 3/1995 | Konar et al. |
| 5,408,405 | A | 4/1995 | Mozumder et al. |
| 5,467,291 | A | 11/1995 | Fan et al. |
| 5,477,444 | A | 12/1995 | Bhat et al. |
| 5,486,996 | A | 1/1996 | Samad et al. |
| 5,933,345 | A * | 8/1999 | Martin et al. ............... 700/44 |
| 6,009,419 | A | 12/1999 | Coveney et al. |
| 6,047,221 | A | 4/2000 | Piche et al. |
| 6,120,173 | A | 9/2000 | Bonissone et al. |
| 6,278,899 | B1 | 8/2001 | Piche et al. |
| 6,381,504 | B1 | 4/2002 | Havener et al. |
| 6,438,430 | B1 | 8/2002 | Martin et al. |
| 6,487,459 | B1 * | 11/2002 | Martin et al. ............... 700/44 |
| 6,625,501 | B2 | 9/2003 | Martin et al. |
| 6,735,483 | B2 | 5/2004 | Martin et al. |
| 6,738,677 | B2 * | 5/2004 | Martin et al. ............... 700/44 |
| 6,839,599 | B2 | 1/2005 | Martin et al. |
| 7,050,866 | B2 * | 5/2006 | Martin et al. ............... 700/44 |

FOREIGN PATENT DOCUMENTS

| | | |
|---|---|---|
| JP | 03-004993 | 10/1991 |
| WO | 93/15448 | 8/1993 |
| WO | 96/12990 | 5/1996 |
| WO | 97/42553 A1 | 11/1997 |

OTHER PUBLICATIONS

T. Graettinger, N. V. Bhat and J. S. Buck; "Adaptive Control with NeuCOP, the Neural Control and Optimization Package"; IEEE International Conference; 1994; pp. 2389-2393.

Kenneth R. Muske, Dan A. Logue and Michael M. Keaton; "Gain Scheduled Model Predictive Control of A Crude Oil Distillation Unit"; AIChE; Aug. 15, 1991; pp. 1-12.

G. D. Martin; "Systematic Process Modeling and Identification for Prediction, Control and Optimization"; Pavilion Invention Disclosure Description; Jun. 9, 1995; 3 pages.

C. E. Garcia, D. M. Prett and M. Morari; "Model Predictive Control: Theory and Practice—A Survey"; Automatica; 1989; pp. 335-348; vol. 25.

Dale E. Seborg, Tomas F. Edgar and Duncan A. Mellichamp; "Process Dynamics and Control"; 1989; Wiley and Sons; New York, NY.

A. V. Oppenheim and R. W. Schafer; "Digital Signal Processing"; 1975; Prentice-Hall; Englewood Cliffs, NJ.

G. E. B. Box and G. M. Jenkins; "Time Series Analysis"; 1976; Holden-Day; San Francisco, CA.

J. L. Shearer, A. T. Murphy and H. H. Richardson; "Introduction to System Dynamics"; 1976; Addison-Wesley; Reading, MA.

P. Eykhoff; "System Identification"; 1974; John Wiley & Sons; New York, NY.

H. Kurz and W. Goedecke; Digital Parameter-Adaptive Control of Processes with Unknown Dead Time; Automatica; 1981; pp. 245-252, vol. 17, No. 1.

H.-T. Su and T. J. McAvoy; "Integration of Multilayer Preceptron Networks and Linear Dynamic Models: A Hammerstein Modeling Approach"; I&EC Research; 1993.

M. Funabashi, I. Aoki, M. Yahiro and H. Inoue; "A fuzzy model based control scheme and its application to a road tunnel ventilation system"; International Conference on Industrial Electronics, Control and Instrumentation; 1991; pp. 1596-1601; vol. 2.

Xie Keming, Zhang Jainwei and T.Y. Lin; "A new dynamic matrix control algorithm based on the FNN TS Fuzzy model"; International Conference on Intelligent Processing Systems; 1997; pp. 317-321; vol. 1.

* cited by examiner

DYNAMIC CONTROLLER UTILIZING A HYBRID MODEL

TECHNICAL FIELD OF THE INVENTION

The present invention pertains in general to modeling techniques and, more particularly, to combining steady-state and dynamic models for the purpose of prediction, control and optimization.

BACKGROUND OF THE INVENTION

Process models that are utilized for prediction, control and optimization can be divided into two general categories, steady-state models and dynamic models. In each case the model is a mathematical construct that characterizes the process, and process measurements are utilized to parameterize or fit the model so that it replicates the behavior of the process. The mathematical model can then be implemented in a simulator for prediction or inverted by an optimization algorithm for control or optimization.

Steady-state or static models are utilized in modern process control systems that usually store a great deal of data, this data typically containing steady-state information at many different operating conditions. The steady-state information is utilized to train a non-linear model wherein the process input variables are represented by the vector U that is processed through the model to output the dependent variable Y. The non-linear model is a steady-state phenomenological or empirical model developed utilizing several ordered pairs $(U_i, Y_i)$ of data from different measured steady states. If a model is represented as:

$$Y = P(U, Y) \quad (1)$$

where P is some parameterization, then the steady-state modeling procedure can be presented as:

$$(\vec{U}, \vec{Y}) \to P \quad (2)$$

where U and Y are vectors containing the $U_i, Y_i$ ordered pair elements. Given the model P, then the steady-state process gain can be calculated as:

$$K = \frac{\Delta P(U, Y)}{\Delta U} \quad (3)$$

The steady-state model therefore represents the process measurements that are taken when the system is in a "static" mode. These measurements do not account for the perturbations that exist when changing from one steady-state condition to another steady-state condition. This is referred to as the dynamic part of a model.

A dynamic model is typically a linear model and is obtained from process measurements which are not steady-state measurements; rather, these are the data obtained when the process is moved from one steady-state condition to another steady-state condition. This procedure is where a process input or manipulated variable u(t) is input to a process with a process output or controlled variable y(t) being output and measured. Again, ordered pairs of measured data (u(I), y(I)) can be utilized to parameterize a phenomenological or empirical model, this time the data coming from non-steady-state operation. The dynamic model is represented as:

$$y(t) = p(u(t), y(t)) \quad (4)$$

where p is some parameterization. Then the dynamic modeling procedure can be represented as:

$$(\vec{u}, \vec{y}) \to p \quad (5)$$

Where u and y are vectors containing the (u(I),y(I)) ordered pair elements. Given the model p, then the steady-state gain of a dynamic model can be calculated as:

$$k = \frac{\Delta p(u, y)}{\Delta u} \quad (6)$$

Unfortunately, almost always the dynamic gain k does not equal the steady-state gain K, since the steady-state gain is modeled on a much larger set of data, whereas the dynamic gain is defined around a set of operating conditions wherein an existing set of operating conditions are mildly perturbed. This results in a shortage of sufficient non-linear information in the dynamic data set in which non-linear information is contained within the static model. Therefore, the gain of the system may not be adequately modeled for an existing set of steady-state operating conditions. Thus, when considering two independent models, one for the steady-state model and one for the dynamic model, there is a mis-match between the gains of the two models when used for prediction, control and optimization. The reason for this mis-match are that the steady-state model is non-linear and the dynamic model is linear, such that the gain of the steady-state model changes depending on the process operating point, with the gain of the linear model being fixed. Also, the data utilized to parameterize the dynamic model do not represent the complete operating range of the process, i.e., the dynamic data is only valid in a narrow region. Further, the dynamic model represents the acceleration properties of the process (like inertia) whereas the steady-state model represents the tradeoffs that determine the process final resting value (similar to the tradeoff between gravity and drag that determines terminal velocity in free fall).

One technique for combining non-linear static models and linear dynamic models is referred to as the Hammerstein model. The Hammerstein model is basically an input-output representation that is decomposed into two coupled parts. This utilizes a set of intermediate variables that are determined by the static models which are then utilized to construct the dynamic model. These two models are not independent and are relatively complex to create.

SUMMARY OF THE INVENTION

The present invention disclosed and claimed herein comprises a method and apparatus for controlling the operation of a plant by predicting a change in the dynamic input values to the plant to effect a change in the output from a current output value at a first time to a desired output value at a second time. The controller includes a dynamic predictive model fore receiving the current input value and the desired output value and predicting a plurality of input values at different time positions between the first time and the second time to define a dynamic operation path of the plant between the current output value and the desired output value at the second time. An optimizer then optimizes the operation of the dynamic controller at each of the different time positions from the first time to the second time in accordance with a predetermined optimization method that optimizes the objectives of the dynamic controller to achieve a desired path. This allows the objectives of the dynamic predictive model to vary as a function of time.

In another aspect of the present invention, the dynamic model includes a dynamic forward model operable to receive input values at each of the time positions and map the received input values through a stored representation of the plant to provide a predicted dynamic output value. An error generator then compares the predicted dynamic output value to the desired output value and generates a primary error value as a difference therebetween for each of the time positions. An error minimization device then determines a change in the input value to minimize the primary error value output by the error generator. A summation device sums the determined input change value with the original input value for each time position to provide a future input value, with a controller controlling the operation of the error minimization device and the optimizer. This minimizes the primary error value in accordance with the predetermined optimization method.

In a yet another aspect of the present invention, the controller is operable to control the summation device to iteratively minimize the primary error value by storing the summed output value from the summation device in a first pass through the error minimization device and then input the latch contents to the dynamic forward model in subsequent passes and for a plurality of subsequent passes. The output of the error minimization device is then summed with the previous contents of the latch, the latch containing the current value of the input on the first pass through the dynamic forward model and the error minimization device. The controller outputs the contents of the latch as the input to the plant after the primary error value has been determined to meet the objectives in accordance with the predetermined optimization method.

In a further aspect of the present invention, a gain adjustment device is provided to adjust the gain of the linear model for substantially all of the time positions. This gain adjustment device includes a non-linear model for receiving an input value and mapping the received input value through a stored representation of the plant to provide on the output thereof a predicted output value, and having a non-linear gain associated therewith. The linear model has parameters associated therewith that define the dynamic gain thereof with a parameter adjustment device then adjusting the parameters of the linear model as a function of the gain of the non-linear model for at least one of the time positions.

In yet a further aspect of the present invention, the gain adjustment device further allows for approximation of the dynamic gain for a plurality of the time positions between the value of the dynamic gain at the first time and the determined dynamic gain at one of the time positions having the dynamic gain thereof determined by the parameter adjustment device. This one time position is the maximum of the time positions at the second time.

In yet another aspect of the present invention, the error minimization device includes a primary error modification device for modifying the primary error to provide a modified error value. The error minimization device optimizes the operation of the dynamic controller to minimize the modified error value in accordance with the predetermined optimization method. The primary error is weighted as a function of time from the first time to the second time, with the weighting function decreasing as a function of time such that the primary error value is attenuated at a relatively high value proximate to the first time and attenuated at a relatively low level proximate to the second time.

In yet a further aspect of the present invention, a predictive system is provided for predicting the operation of a plant with the predictive system having an input for receiving input value and an output for providing a predicted output value. The system includes a non-linear model having an input for receiving the input value and mapping it across a stored learned representation of the plant to provide a predicted output. The non-linear model has an integrity associated therewith that is a function of a training operation that varies across the mapped space. A first principles model is also provided for providing a calculator representation of the plant. Additionally, the predictive system may include a linearized first principles model which may be a linearization of the first principles model described above. A domain analyzer determines when the input value falls within a region of the mapped space having an integrity associated therewith that is less than a first and/or a second integrity threshold. A domain switching device is operable to switch operation between the non-linear model, the first principles model, and/or the linearized first principles model as a function of the determined integrity level comparison with the threshold. If it is above the integrity threshold, the non-linear model is utilized and, if it is below the integrity threshold, the linearized first principles model and/or the first principles model is utilized. Alternatively, where two thresholds are utilized, if the integrity is above the first integrity threshold, the non-linear model is utilized, if it is below the first threshold and above the second threshold, the first principles model is utilized, and if the integrity is below the second threshold, then the linearized first principles model is utilized. Thus, the domain switching device may determine which model should be utilized in the predictive system.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
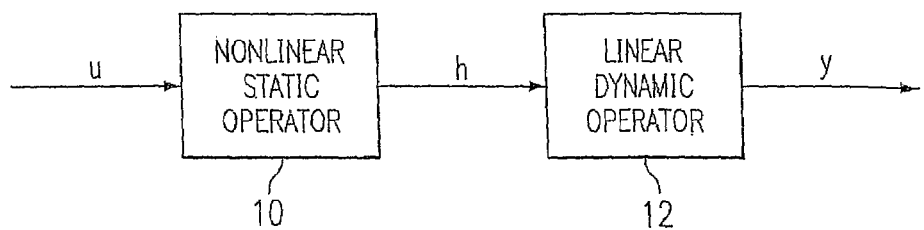
FIG. 1 illustrates a prior art Hammerstein model.

Referring now to FIG. 1, there is illustrated a diagrammatic view of a Hammerstein model of the prior art. This is comprised of a non-linear static operator model 10 and a linear dynamic model 12, both disposed in a series configuration. The operation of this model is described in H. T. Su, and T. J. McAvoy, "Integration of Multilayer Perceptron Networks and Linear Dynamic Models: A Hammerstein Modeling Approach" to appear in *I & EC Fundamentals*, paper dated Jul. 7, 1992, which reference is incorporated herein by reference. Hammerstein models in general have been utilized in modeling non-linear systems for some time. The structure of the Hammerstein model illustrated in FIG. 1 utilizes the non-linear static operator model 10 to transform the input U into intermediate variables H. The non-linear operator is usually represented by a finite polynomial expansion. However, this could utilize a neural network or any type of compatible modeling system. The linear dynamic operator model 12 could utilize a discreet dynamic transfer function representing the dynamic relationship between the intermediate variable H and the output Y. For multiple input systems, the non-linear operator could utilize a multilayer neural network, whereas the linear operator could utilize a two layer neural network. A neural network for the static operator is generally well known and described in U.S. Pat. No. 5,353,207, issued Oct. 4, 1994, and assigned to the present assignee, which is incorporated herein by reference. These type of networks are typically referred to as a multilayer feed-forward network which utilizes training in the form of back-propagation. This is typically performed on a large set of training data. Once trained, the network has weights associated therewith, which are stored in a separate database.

Once the steady-state model is obtained, one can then choose the output vector from the hidden layer in the neural network as the intermediate variable for the Hammerstein model. In order to determine the input for the linear dynamic operator, u(t), it is necessary to scale the output vector h(d) from the non-linear static operator model 10 for the mapping of the intermediate variable h(t) to the output variable of the dynamic model y(t), which is determined by the linear dynamic model.

During the development of a linear dynamic model to represent the linear dynamic operator, in the Hammerstein model, it is important that the steady-state non-linearity remain the same. To achieve this goal, one must train the dynamic model subject to a constraint so that the non-linearity learned by the steady-state model remains unchanged after the training. This results in a dependency of the two models on each other.

Figure 2:
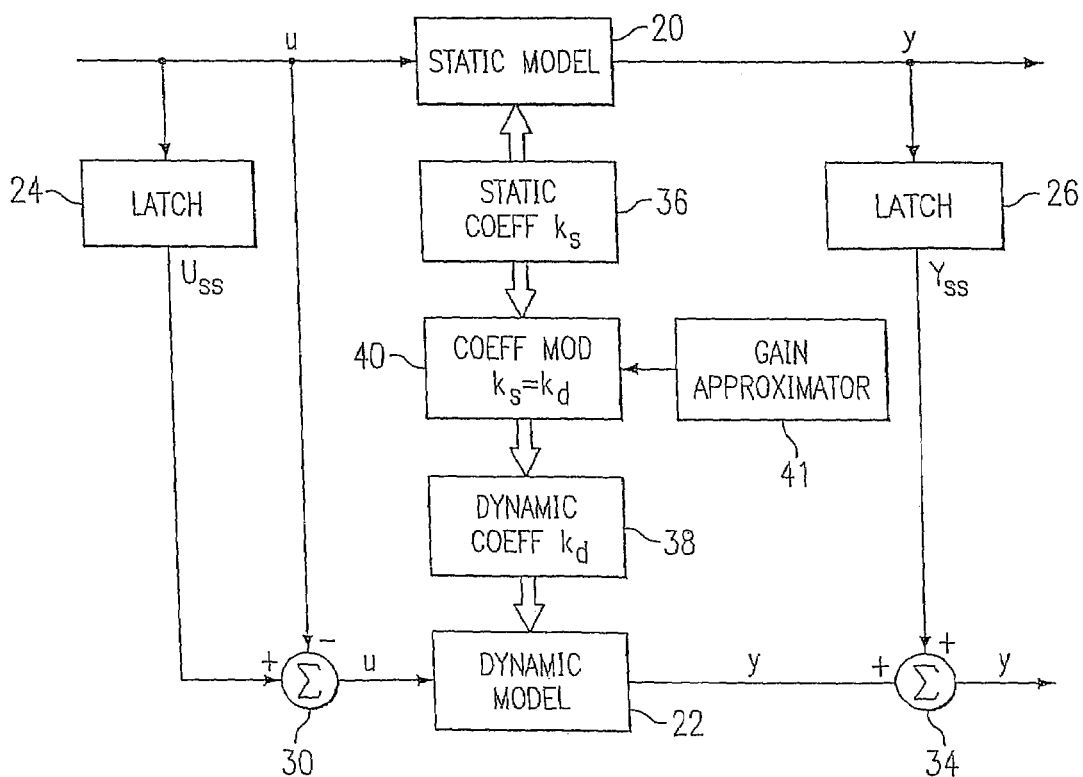
FIG. 2 illustrates a block diagram of the modeling technique of the present invention.

Referring now to FIG. 2, there is illustrated a block diagram of the modeling method of the present invention, which is referred to as a systematic modeling technique. The general concept of the systematic modeling technique in the present invention results from the observation that, while process gains (steady-state behavior) vary with U's and Y's, (i.e., the gains are non-linear), the process dynamics seemingly vary with time only, (i.e., they can be modeled as locally linear, but time-varied). By utilizing non-linear models for the steady-state behavior and linear models for the dynamic behavior, several practical advantages result. They are as follows:

1. Completely rigorous models can be utilized for the steady-state part. This provides a credible basis for economic optimization.
2. The linear models for the dynamic part can be updated on-line, i.e., the dynamic parameters that are known to be time-varying can be adapted slowly.
3. The gains of the dynamic models and the gains of the steady-state models can be forced to be consistent (k=K).

With further reference to FIG. 2, there are provided a static or steady-state model 20 and a dynamic model 22. The static model 20, as described above, is a rigorous model that is trained on a large set of steady-state data. The static model 20 will receive a process input U and provide a predicted output Y. These are essentially steady-state values. The steady-state values at a given time are latched in various latches, an input latch 24 and an output latch 26. The latch 24 contains the steady-state value of the input $U_{ss}$, and the latch 26 contains the steady-state output value $Y_{ss}$. The dynamic model 22 is utilized to predict the behavior of the plant when a change is made from a steady-state value of $Y_{ss}$ to a new value Y. The dynamic model 22 receives on the input the dynamic input value u and outputs a predicted dynamic value y. The value u is comprised of the difference between the new value U and the steady-state value in the latch 24, $U_{ss}$. This is derived from a subtraction circuit 30 which receives on the positive input thereof the output of the latch 24 and on the negative input thereof the new value of U. This therefore represents the delta change from the steady-state. Similarly, on the output the predicted overall dynamic value will be the sum of the output value of the dynamic model, y, and the steady-state output value stored in the latch 26, $Y_{ss}$. These two values are summed with a summing block 34 to provide a predicted output Y. The difference between the value output by the summing junction 34 and the predicted value output by the static model 20 is that the predicted value output by the summing junction 20 accounts for the dynamic operation of the system during a change. For example, to process the input values that are in the input vector U by the static model 20, the rigorous model, can take significantly more time than running a relatively simple dynamic model. The method utilized in the present invention is to force the gain of the dynamic model 22 $k_d$ to equal the gain $K_{ss}$ of the static model 20.

In the static model 20, there is provided a storage block 36 which contains the static coefficients associated with the static model 20 and also the associated gain value $K_{ss}$. Similarly, the dynamic model 22 has a storage area 38 that is operable to contain the dynamic coefficients and the gain value $k_d$. One of the important aspects of the present invention is a link block 40 that is operable to modify the coefficients in the storage area 38 to force the value of $k_d$ to be equal to the value of $K_{ss}$. Additionally, there is an approximation block 41 that allows approximation of the dynamic gain $k_d$ between the modification updates.

Systematic Model

The linear dynamic model 22 can generally be represented by the following equations:

$$\delta y(t) = \sum_{i=1}^{n} b_i \delta u(t-d-i) - \sum_{i=1}^{n} a_i \delta y(t-i) \quad (7)$$

where:

$$\delta y(t) = y(t) - Y_{ss} \quad (8)$$

$$\delta u(t) = u(t) - u_{ss} \quad (9)$$

and t is time, $a_i$ and $b_i$ are real numbers, d is a time delay, u(t) is an input and y(t) an output. The gain is represented by:

$$\frac{y(B)}{u(B)} = k = \frac{\left(\sum_{i=1}^{n} b_i B^{i-1}\right) B^d}{1 + \sum_{i=1}^{n} a_i B^{i-1}} \quad (10)$$

where B is the backward shift operator B(x(t))=x(t−1), t=time, the $a_i$ and $b_i$ are real numbers, I is the number of discreet time intervals in the dead-time of the process, and n is the order of the model. This is a general representation of a linear dynamic model, as contained in George E. P. Box and G. M. Jenkins, "TIME SERIES ANALYSIS forecasting and control", Holden-Day, San Francisco, 1976, Section 10.2, Page 345. This reference is incorporated herein by reference.

The gain of this model can be calculated by setting the value of B equal to a value of "1". The gain will then be defined by the following equation:

$$\left[\frac{y(B)}{u(B)}\right]_{B=1} = k_d = \frac{\sum_{i=1}^{n} b_i}{1 + \sum_{i=1}^{n} a_i} \quad (11)$$

The $a_i$ contain the dynamic signature of the process, its unforced, natural response characteristic. They are independent of the process gain. The $b_i$ contain part of the dynamic signature of the process; however, they alone contain the result of the forced response. The $b_i$ determine the gain k of the dynamic model. See: J. L. Shearer, A. T. Murphy, and H. H. Richardson, "Introduction to System Dynamics", Addison-Wesley, Reading, Mass., 1967, Chapter 12. This reference is incorporated herein by reference.

Since the gain $K_{ss}$ of the steady-state model is known, the gain $k_d$ of the dynamic model can be forced to match the gain of the steady-state model by scaling the $b_i$ parameters. The values of the static and dynamic gains are set equal with the value of $b_i$ scaled by the ratio of the two gains:

$$(b_i)_{scaled} = (b_i)_{old}\left(\frac{K_{ss}}{k_d}\right) \quad (12)$$

$$(b_i)_{scaled} = \frac{(b_i)_{old} K_{ss}\left(1 + \sum_{i=1}^{n} a_i\right)}{\sum_{i=1}^{n} b_i} \quad (13)$$

This makes the dynamic model consistent with its steady-state counterpart. Therefore, each time the steady-state value changes, this corresponds to a gain $K_{ss}$ of the steady-state model. This value can then be utilized to update the gain $k_d$ of the dynamic model and, therefore, compensate for the errors associated with the dynamic model wherein the value of $k_d$ is determined based on perturbations in the plant on a given set of operating conditions. Since all operating conditions are not modeled, the step of varying the gain will account for changes in the steady-state starting points.

Figure 3A:
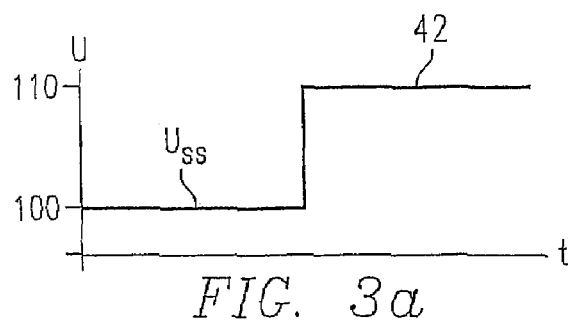
FIG. 3a-3d illustrate timing diagrams for the various outputs of the system of FIG. 2.
Figure 3B:
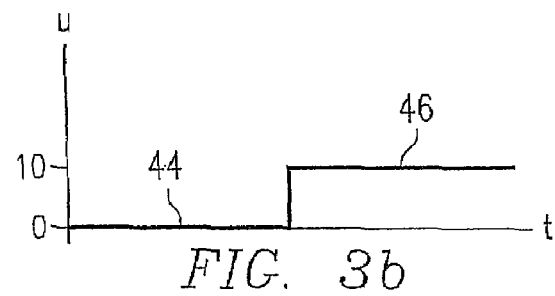
Figure 3C:
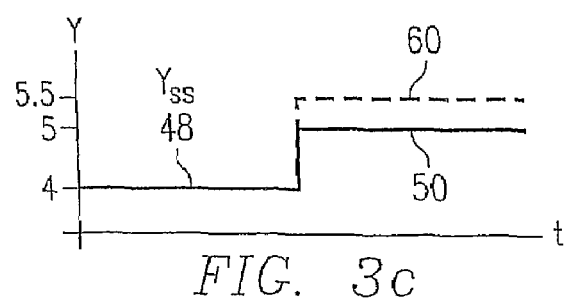
Figure 3D:
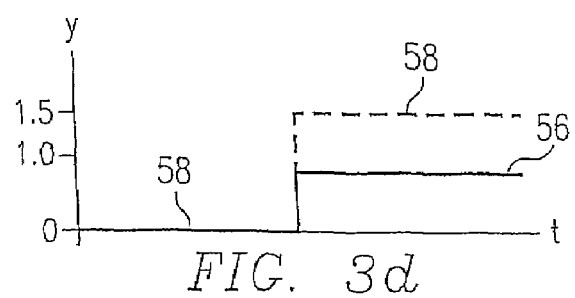

Referring now to FIGS. 3a-3d, there are illustrated plots of the system operating in response to a step function wherein the input value U changes from a value of 100 to a value of 110. In FIG. 3a, the value of 100 is referred to as the previous steady-state value $U_{ss}$. In FIG. 3b, the value of u varies from a value of 0 to a value of 10, this representing the delta between the steady-state value of $U_{ss}$ to the level of 110, represented by reference numeral 42 in FIG. 3a. Therefore, in FIG. 3b the value of u will go from 0 at a level 44, to a value of 10 at a level 46. In FIG. 3c, the output Y is represented as having a steady-state value $Y_{ss}$ of 4 at a level 48. When the input value U rises to the level 42 with a value of 110, the output value will rise. This is a predicted value. The predicted value which is the proper output value is represented by a level 50, which level 50 is at a value of 5. Since the steady-state value is at a value of 4, this means that the dynamic system must predict a difference of a value of 1. This is represented by FIG. 3d wherein the dynamic output value y varies from a level 54 having a value of 0 to a level 56 having a value of 1.0. However, without the gain scaling, the dynamic model could, by way of example, predict a value for y of 1.5, represented by dashed level 58, if the steady-state values were outside of the range in which the dynamic model was trained. This would correspond to a value of 5.5 at a level 60 in the plot of FIG. 3c. It can be seen that the dynamic model merely predicts the behavior of the plant from a starting point to a stopping point, not taking into consideration the steady-state values. It assumes that the steady-state values are those that it was trained upon. If the gain $k_d$ were not scaled, then the dynamic model would assume that the steady-state values at the starting point were the same that it was trained upon. However, the gain scaling link between the steady-state model and the dynamic model allow the gain to be scaled and the parameter $b_i$ to be scaled such that the dynamic operation is scaled and a more accurate prediction is made which accounts for the dynamic properties of the system.

Figure 4:
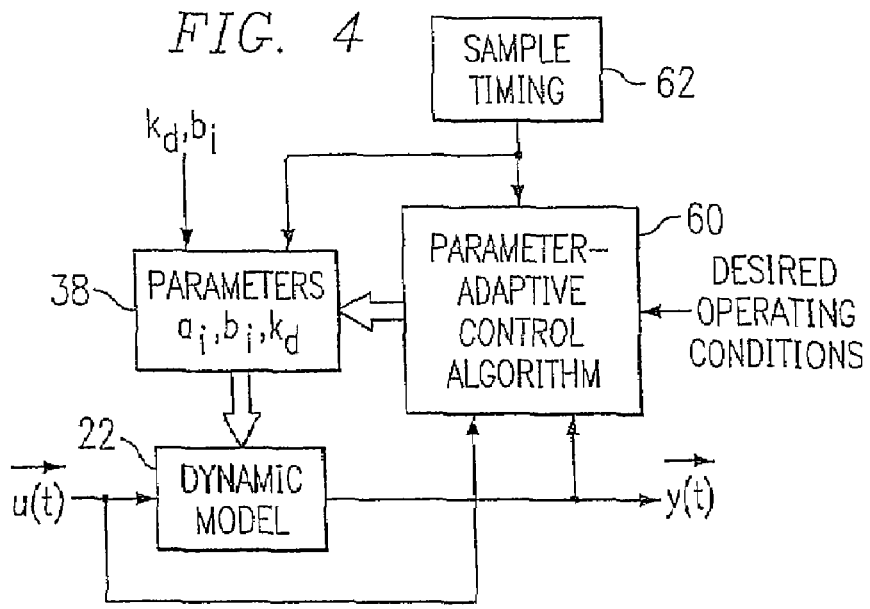
FIG. 4 illustrates a detailed block diagram of the dynamic model utilizing the identification method.

Referring now to FIG. 4, there is illustrated a block diagram of a method for determining the parameters $a_i$, $b_i$. This is usually achieved through the use of an identification algorithm, which is conventional. This utilizes the (u(t),y(t)) pairs to obtain the $a_i$ and $b_i$ parameters. In the preferred embodiment, a recursive identification method is utilized where the $a_i$ and $b_i$ parameters are updated with each new $(u_i(t), y_i(t))$ pair. See: T. Eykhoff "System Identification", John Wiley & Sons, New York, 1974, Pages 38 and 39, et. seq., and H. Kurz and W. Godecke, "Digital Parameter-Adaptive Control Processes with Unknown Dead Time", Automatica, Vol. 17, No. 1, 1981, pp. 245-252, which references are incorporated herein by reference.

In the technique of FIG. 4, the dynamic model 22 has the output thereof input to a parameter-adaptive control algorithm block 60 which adjusts the parameters in the coefficient storage block 38, which also receives the scaled values of k, $b_i$. This is a system that is updated on a periodic basis, as defined by timing block 62. The control algorithm 60 utilizes both the input u and the output y for the purpose of determining and updating the parameters in the storage area 38.

Figure 5:
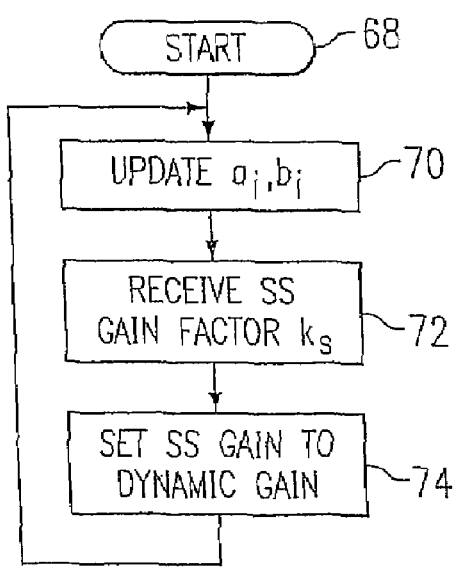
FIG. 5 illustrates a block diagram of the operation of the model of FIG. 4.

Referring now to FIG. 5, there is illustrated a block diagram of the preferred method. The program is initiated in a block 68 and then proceeds to a function block 70 to update the parameters $a_i$, $b_i$ utilizing the (u(I),y(I)) pairs. Once these are updated, the program flows to a function block 72 wherein the steady-state gain factor K is received, and then to a function block 74 to set the dynamic gain to the steady state gain, i.e., provide the scaling function described hereinabove. This is performed after the update. This procedure can be used for on-line identification, non-linear dynamic model prediction and adaptive control.

Figure 6:
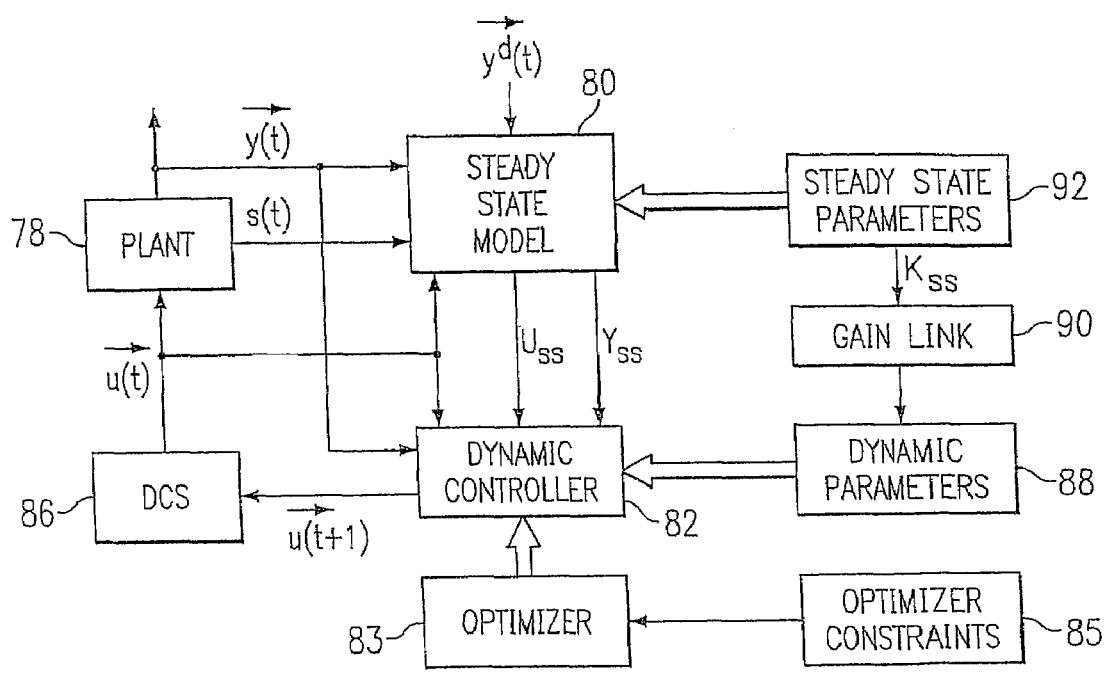
FIG. 6 illustrates an example of the modeling technique of the present invention utilized in a control environment.

Referring now to FIG. 6, there is illustrated a block diagram of one application of the present invention utilizing a control environment. A plant 78 is provided which receives input values u(t) and outputs an output vector y(t). The plant 78 also has measurable state variables s(t). A predictive model 80 is provided which receives the input values u(t) and the state variables s(t) in addition to the output value y(t). The steady-state model 80 is operable to output a predicted value of both y(t) and also of a future input value u(t+1). This constitutes a steady-state portion of the system. The predicted steady-state input value is $U_{ss}$ with the predicted steady-state output value being $Y_{ss}$. In a conventional control scenario, the steady-state model 80 would receive as an external input a desired value of the output $y^d(t)$ which is the desired value that the overall control system seeks to achieve. This is achieved by controlling a distributed control system (DCS) 86 to produce a desired input to the plant. This is referred to as u(t+1), a future value. Without considering the dynamic response, the predictive model 80, a steady-state model, will provide the steady-state values. However, when a change is desired, this change will effectively be viewed as a "step response".

To facilitate the dynamic control aspect, a dynamic controller 82 is provided which is operable to receive the input u(t), the output value y(t) and also the steady-state values $U_{ss}$ and $Y_{ss}$ and generate the output u(t+1). The dynamic controller effectively generates the dynamic response between the changes, i.e., when the steady-state value changes from an initial steady-state value $U_{ss}^i, Y_{ss}^i$ to a final steady-state value $u_{ss}^f, Y_{ss}^f$.

During the operation of the system, the dynamic controller 82 is operable in accordance with the embodiment of FIG. 2 to update the dynamic parameters of the dynamic controller 82 in a block 88 with a gain link block 90, which utilizes the value $K_{ss}$ from a steady-state parameter block in order to scale the parameters utilized by the dynamic controller 82, again in accordance with the above described method. In this manner, the control function can be realized. In addition, the dynamic controller 82 has the operation thereof optimized such that the path traveled between the initial and final steady-state values is achieved with the use of the optimizer 83 in view of optimizer constraints in a block 85. In general, the predicted model (steady-state model) 80 provides a control network function that is operable to predict the future input values.

Without the dynamic controller 82, this is a conventional control network which is generally described in U.S. Pat. No. 5,353,207, issued Oct. 4, 1994, to the present assignee, which patent is incorporated herein by reference.

Approximate Systematic Modeling

For the modeling techniques described thus far, consistency between the steady-state and dynamic models is maintained by rescaling the $b_i$ parameters at each time step utilizing equation 13. If the systematic model is to be utilized in a Model Predictive Control (MPC) algorithm, maintaining consistency may be computationally expensive. These types of algorithms are described in C. E. Garcia, D. M. Prett and M. Morari. Model predictive control: theory and practice—a survey, Automatica, 25:335-348, 1989; D. E. Seborg, T. F. Edgar, and D. A. Mellichamp. Process Dynamics and Control. John Wiley and Sons, New York, N.Y., 1989. These references are incorporated herein by reference. For example, if the dynamic gain $k_d$ is computed from a neural network steady-state model, it would be necessary to execute the neural network module each time the model was iterated in the MPC algorithm. Due to the potentially large number of model iterations for certain MPC problems, it could be computationally expensive to maintain a consistent model. In this case, it would be better to use an approximate model which does not rely on enforcing consistencies at each iteration of the model.

Figure 7:
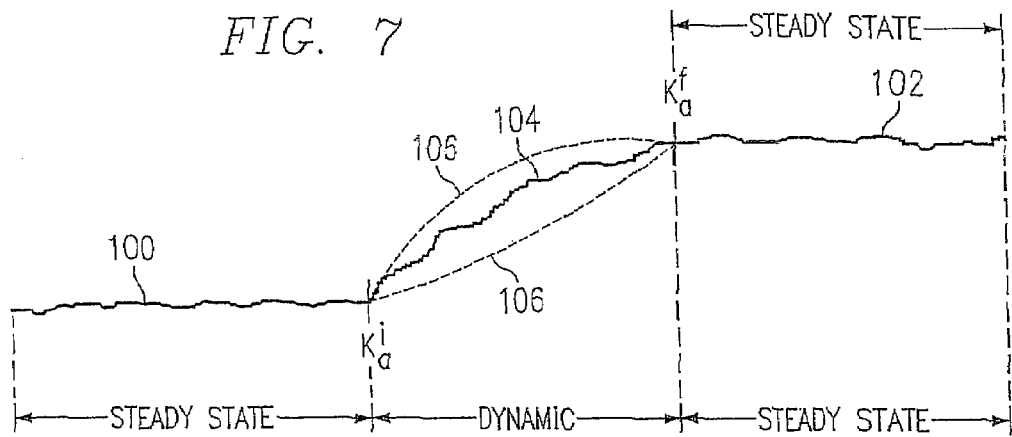
FIG. 7 illustrates a diagrammatic view of a change between two steady-state values.

Referring now to FIG. 7, there is illustrated a diagram for a change between steady state values. As illustrated, the steady-state model will make a change from a steady-state value at a line 100 to a steady-state value at a line 102. A transition between the two steady-state values can result in unknown settings. The only way to insure that the settings for the dynamic model between the two steady-state values, an initial steady-state value $K_{ss}^i$ and a final steady-state gain $K_{ss}^f$, would be to utilize a step operation, wherein the dynamic gain $k_d$ was adjusted at multiple positions during the change. However, this may be computationally expensive. As will be described hereinbelow, an approximation algorithm is utilized for approximating the dynamic behavior between the two steady-state values utilizing a quadratic relationship. This is defined as a behavior line 104, which is disposed between an envelope 106, which behavior line 104 will be described hereinbelow.

Figure 8:
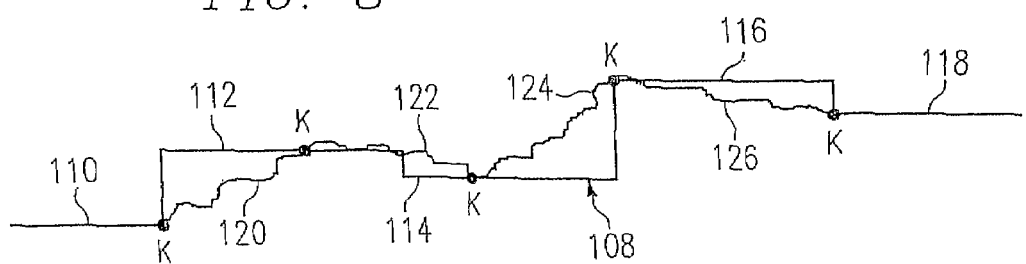
FIG. 8 illustrates a diagrammatic view of the approximation algorithm for changes in the steady-state value.

Referring now to FIG. 8, there is illustrated a diagrammatic view of the system undergoing numerous changes in steady-state value as represented by a stepped line 108. The stepped line 108 is seen to vary from a first steady-state value at a level 110 to a value at a level 112 and then down to a value at a level 114, up to a value at a level 116 and then down to a final value at a level 118. Each of these transitions can result in unknown states. With the approximation algorithm that will be described hereinbelow, it can be seen that, when a transition is made from level 110 to level 112, an approximation curve for the dynamic behavior 120 is provided. When making a transition from level 114 to level 116, an approximation gain curve 124 is provided to approximate the steady state gains between the two levels 114 and 116. For making the transition from level 116 to level 118, an approximation gain curve 126 for the steady-state gain is provided. It can therefore be seen that the approximation curves 120-126 account for transitions between steady-state values that are determined by the network, it being noted that these are approximations which primarily maintain the steady-state gain within some type of error envelope, the envelope 106 in FIG. 7.

The approximation is provided by the block 41 noted in FIG. 2 and can be designed upon a number of criteria, depending upon the problem that it will be utilized to solve. The system in the preferred embodiment, which is only one example, is designed to satisfy the following criteria:

1. Computational Complexity: The approximate systematic model will be used in a Model Predictive Control algorithm, therefore, it is required to have low computational complexity.
2. Localized Accuracy: The steady-state model is accurate in localized regions. These regions represent the steady-state operating regimes of the process. The steady-state model is significantly less accurate outside these localized regions.
3. Final Steady-State: Given a steady-state set point change, an optimization algorithm which uses the steady-state model will be used to compute the steady-state inputs required to achieve the set point. Because of item 2, it is assumed that the initial and final steady-states associated with a set-point change are located in regions accurately modeled by the steady-state model.

Given the noted criteria, an approximate systematic model can be constructed by enforcing consistency of the steady-state and dynamic model at the initial and final steady-state associated with a set point change and utilizing a linear approximation at points in between the two steady-states. This approximation guarantees that the model is accurate in regions where the steady-state model is well known and utilizes a linear approximation in regions where the steady-state model is known to be less accurate. In addition, the resulting model has low computational complexity. For purposes of this proof, Equation 13 is modified as follows:

$$b_{i,scaled} = \frac{b_i K_{ss}(u(t-d-1))\left(1 + \sum_{i=1}^{n} a_i\right)}{\sum_{i=1}^{n} b_i} \quad (14)$$

This new equation 14 utilizes $K_{ss}(u(t-d-1))$ instead of $K_{ss}(u(t))$ as the consistent gain, resulting in a systematic model which is delay invariant.

The approximate systematic model is based upon utilizing the gains associated with the initial and final steady-state values of a set-point change. The initial steady-state gain is denoted $K^i_{ss}$ while the initial steady-state input is given by $U^i_{ss}$. The final steady-state gain is $K^f_{ss}$ and the final input is $U^f_{ss}$. Given these values, a linear approximation to the gain is given by:

$$K_{ss}(u(t)) = K^i_{ss} + \frac{K^f_{ss} - K^i_{ss}}{U^f_{ss} - U^i_{ss}}(u(t) - U^i_{ss}). \quad (15)$$

Substituting this approximation into Equation 13 and replacing $u(t-d-1)-u^i$ by $\delta u(t-d-1)$ yields:

$$\tilde{b}_{j,scaled} = \frac{b_j K^i_{ss}\left(1 + \sum_{i=1}^{n} a_i\right)}{\sum_{i=1}^{n} b_i} + \frac{1}{2}\frac{b_j\left(1 + \sum_{i=1}^{n} a_i\right)(K^f_{ss} - K^i_{ss})}{\left(\sum_{i=1}^{n} b_i\right)(U^f_{ss} - U^i_{ss})}\delta u(t-d-i). \quad (16)$$

To simplify the expression, define the variable $\bar{b}_j$-Bar as:

$$\bar{b}_j = \frac{b_j K^i_{ss}\left(1 + \sum_{i=1}^{n} a_i\right)}{\sum_{i=1}^{n} b_i} \quad (17)$$

and $g_j$ as:

$$g_j = \frac{b_j\left(1 + \sum_{i=1}^{n} a_i\right)(K^f_{ss} - K^i_{ss})}{\left(\sum_{i=1}^{n} b_1\right)(U^f_{ss} - U^i_{ss})} \quad (18)$$

Equation 16 may be written as:

$$\tilde{b}_{j,scaled} = \bar{b}_j + g_j \delta u(t-d-i). \quad (19)$$

Finally, substituting the scaled b's back into the original difference Equation 7, the following expression for the approximate systematic model is obtained:

$$\delta y(t) = \quad (20)$$
$$\sum_{i=1}^{n} \bar{b}_i \delta u(t-d-i) + \sum_{i=1}^{n} g_i \delta u(t-d-i^2)\delta u(t-d-i) - \sum_{i=1}^{n} a_i \delta y(t-i)$$

The linear approximation for gain results in a quadratic difference equation for the output. Given Equation 20, the approximate systematic model is shown to be of low computational complexity. It may be used in a MPC algorithm to efficiently compute the required control moves for a transition from one steady-state to another after a set-point change. Note that this applies to the dynamic gain variations between steady-state transitions and not to the actual path values.

Control System Error Constraints

Figure 9:
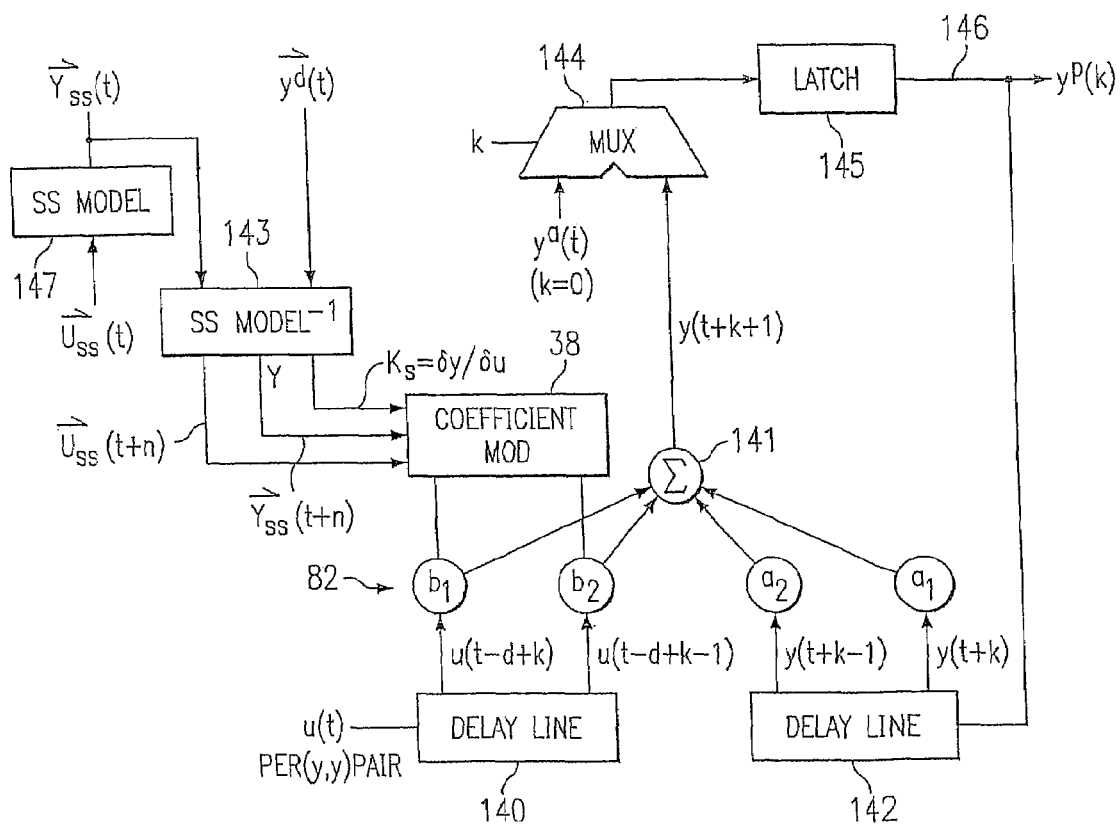
FIG. 9 illustrates a block diagram of the dynamic model.

Referring now to FIG. 9, there is illustrated a block diagram of the prediction engine for the dynamic controller 82 of FIG. 6. The prediction engine is operable to essentially predict a value of y(t) as the predicted future value y(t+1). Since the prediction engine must determine what the value of the output y(t) is at each future value between two steady-state values, it is necessary to perform these in a "step" manner. Therefore, there will be k steps from a value of zero to a value of N, which value at k=N is the value at the "horizon", the desired value. This, as will be described hereinbelow, is an iterative process, it being noted that the terminology for "(t+1)" refers to an incremental step, with an incremental step for the dynamic controller being smaller than an incremented step for the steady-state model. For the steady-state model, "y(t+N)" for the dynamic model will be, "y(t+1)" for the steady state The value y(t+1) is defined as follows:

$$y(t+1) = a_1 y(t) + a_2 y(t-1) + b_1 u(t-d-1) + b_2 u(t-d-2) \quad (21)$$

With further reference to FIG. 9, the input values u(t) for each (u,y) pair are input to a delay line 140. The output of the delay line provides the input value u(t) delayed by a delay value "d". There are provided only two operations for multiplication with the coefficients $b_1$ and $b_2$, such that only two values u(t) and u(t−1) are required. These are both delayed and then multiplied by the coefficients $b_1$ and $b_2$ and then input to a summing block 141. Similarly, the output value $y^p(t)$ is input to a delay line 142, there being two values required for multiplication with the coefficients $a_1$ and $a_2$. The output of this multiplication is then input to the summing block 141. The input to the delay line 142 is either the actual input value $y^a(t)$ or the iterated output value of the summation block 141, which is the previous value computed by the dynamic controller 82. Therefore, the summing block 141 will output the predicted value y(t+1) which will then be input to a multiplexer 144. The multiplexer 144 is operable to select the actual output $y^a(t)$ on the first operation and, thereafter, select the output of the summing block 141. Therefore, for a step value of k=0 the value $y^a(t)$ will be selected by the multiplexer 144 and will be latched in a latch 145. The latch 145 will provide the predicted value $y^p(t+k)$ on an output 146. This is the predicted value of y(t) for a given k that is input back to the input of delay line 142 for multiplication with the coefficients $a_1$ and $a_2$. This is iterated for each value of k from k=0 to k=N.

The $a_1$ and $a_2$ values are fixed, as described above, with the $b_1$ and $b_2$ values scaled. This scaling operation is performed by the coefficient modification block 38. However, this only defines the beginning steady-state value and the final steady-state value, with the dynamic controller and the optimization routines described in the present application defining how the dynamic controller operates between the steady-state values and also what the gain of the dynamic controller is. The gain specifically is what determines the modification operation performed by the coefficient modification block 38.

In FIG. 9, the coefficients in the coefficient modification block 38 are modified as described hereinabove with the information that is derived from the steady-state model. The steady-state model is operated in a control application, and is comprised in part of a forward steady-state model 141 which is operable to receive the steady-state input value $U_{ss}(t)$ and predict the steady-state output value $Y_{ss}(t)$. This predicted value is utilized in an inverse steady-state model 143 to receive the desired value $y^d(t)$ and the predicted output of the steady-state model 141 and predict a future steady-state input value or manipulated value $U_{ss}(t+N)$ and also a future steady-state input value $Y_{ss}(t+N)$ in addition to providing the steady-state gain $K_{ss}$. As described hereinabove, these are utilized to generate scaled b-values. These b-values are utilized to define the gain $k_d$ of the dynamic model. In can therefore be seen that this essentially takes a linear dynamic model with a fixed gain and allows it to have a gain thereof modified by a non-linear model as the operating point is moved through the output space.

Figure 10:
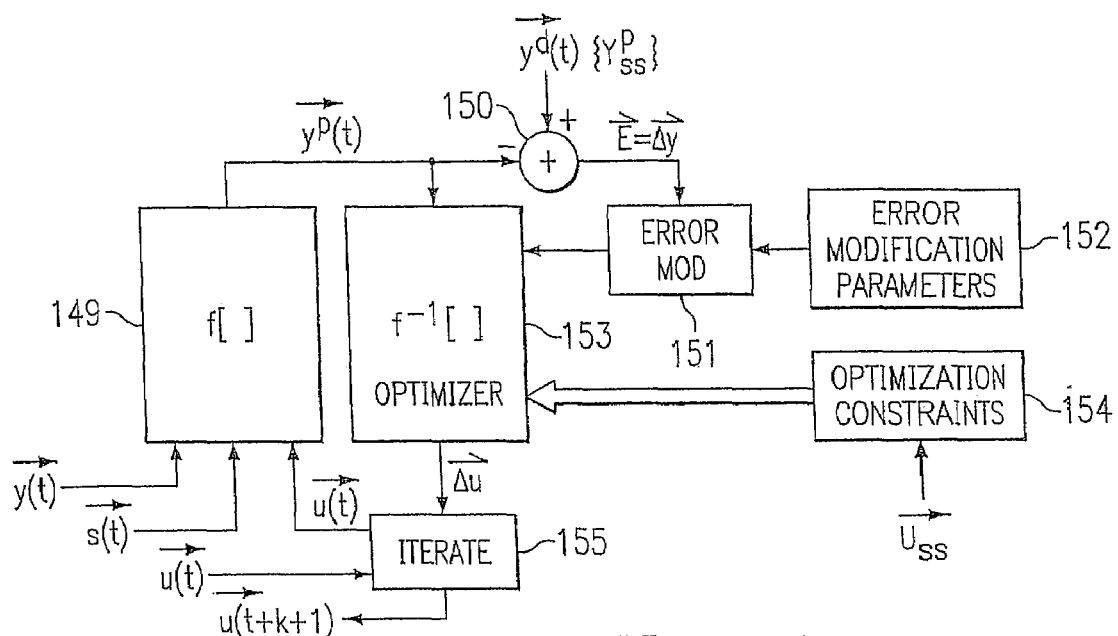
FIG. 10 illustrates a detail of the control network utilizing the error constraining algorithm of the present invention.

Referring now to FIG. 10, there is illustrated a block diagram of the dynamic controller and optimizer. The dynamic controller includes a dynamic model 149 which basically defines the predicted value $y^p(k)$ as a function of the inputs y(t), s(t) and u(t). This was essentially the same model that was described hereinabove with reference to FIG. 9. The model 149 predicts the output values $y^p(k)$ between the two steady-state values, as will be described hereinbelow. The model 149 is predefined and utilizes an identification algorithm to identify the $a_1$, $a_2$, $b_1$ and $b_2$ coefficients during training. Once these are identified in a training and identification procedure, these are "fixed". However, as described hereinabove, the gain of the dynamic model is modified by scaling the coefficients $b_1$ and $b_2$. This gain scaling is not described with respect to the optimization operation of FIG. 10, although it can be incorporated in the optimization operation.

The output of model 149 is input to the negative input of a summing block 150. Summing block 150 sums the predicted output $y^p(k)$ with the desired output $y^d(t)$. In effect, the desired value of $y^d(t)$ is effectively the desired steady-state value $Y_{ss}^f$, although it can be any desired value. The output of the summing block 150 comprises an error value which is essentially the difference between the desired value $y^d(t)$ and the predicted value $y^p(k)$. The error value is modified by an error modification block 151, as will be described hereinbelow, in accordance with error modification parameters in a block 152. The modified error value is then input to an inverse model 153, which basically performs an optimization routine to predict a change in the input value u(t). In effect, the optimizer 153 is utilized in conjunction with the model 149 to minimize the error output by summing block 150. Any optimization function can be utilized, such as a Monte Carlo procedure. However, in the present invention, a gradient calculation is utilized. In the gradient method, the gradient $\partial(y)/\partial(u)$ is calculated and then a gradient solution performed as follows:

$$\Delta u_{new} = \Delta u_{old} + \left(\frac{\partial(y)}{\partial(u)}\right) \times E \tag{22}$$

The optimization function is performed by the inverse model 153 in accordance with optimization constraints in a block 154. An iteration procedure is performed with an iterate block 155 which is operable to perform an iteration with the combination of the inverse model 153 and the predictive model 149 and output on an output line 156 the future value u(t+k+1). For k=0, this will be the initial steady-state value and for k=N, this will be the value at the horizon, or at the next steady-state value. During the iteration procedure, the previous value of u(t+k) has the change value Δu added thereto. This value is utilized for that value of k until the error is within the appropriate levels. Once it is at the appropriate level, the next u(t+k) is input to the model 149 and the value thereof optimized with the iterate block 155. Once the iteration procedure is done, it is latched. As will be described hereinbelow, this is a combination of modifying the error such that the actual error output by the block 150 is not utilized by the optimizer 153 but, rather, a modified error is utilized. Alternatively, different optimization constraints can be utilized, which are generated by the block 154, these being described hereinbelow.

Figure 11A:
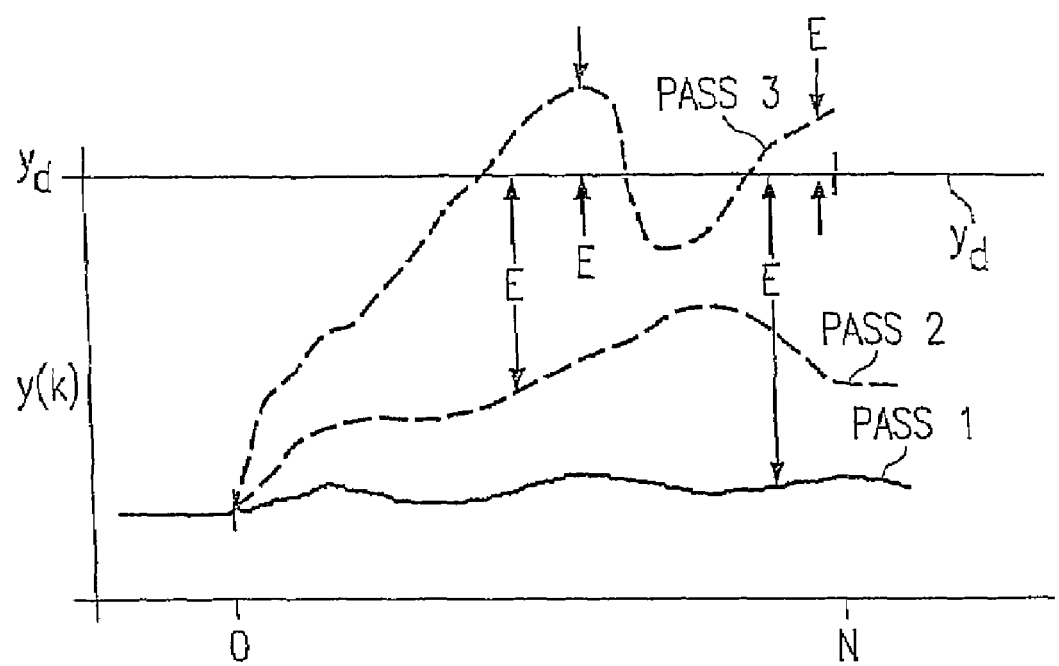
FIGS. 11a and 11b illustrate plots of the input and output during optimization.
Figure 11B:
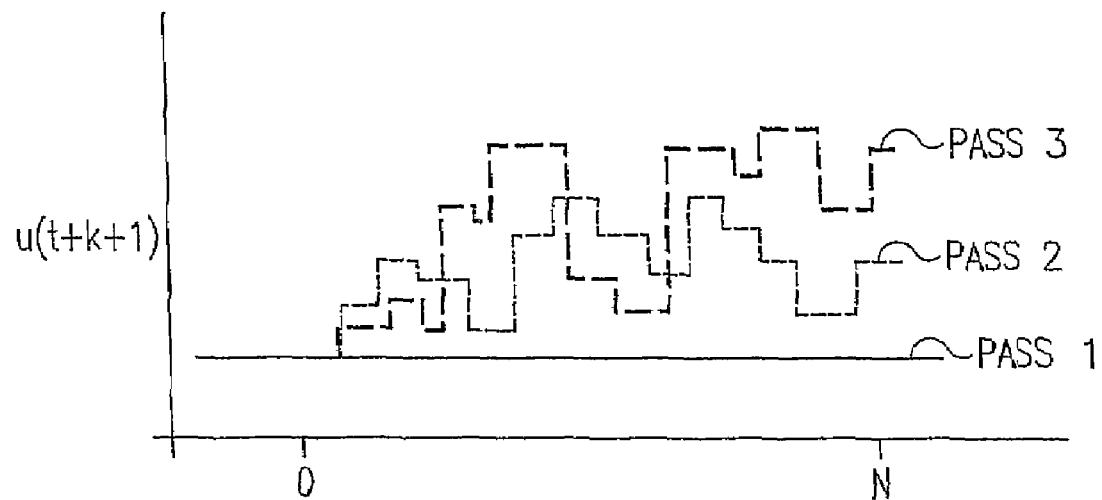

Referring now to FIGS. 11a and 11b, there are illustrated plots of the output y(t+k) and the input $u_k(t+k+1)$, for each k from the initial steady-state value to the horizon steady-state value at k=N. With specific reference to FIG. 11a, it can be seen that the optimization procedure is performed utilizing multiple passes. In the first pass, the actual value $u^a(t+k)$ for each k is utilized to determine the values of y(t+k) for each u,y pair. This is then accumulated and the values processed through the inverse model 153 and the iterate block 155 to minimize the error. This generates a new set of inputs $u_k(t+k+1)$ illustrated in FIG. 11b. Therefore, the optimization after pass 1 generates the values of u(t+k+1) for the second pass. In the second pass, the values are again optimized in accordance with the various constraints to again generate another set of values for u(t+k+1). This continues until the overall objective function is reached. This objective function is a combination of the operations as a function of the error and the operations as a function of the constraints, wherein the optimization constraints may control the overall operation of the inverse model 153 or the error modification parameters in block 152 may control the overall operation. Each of the optimization constraints will be described in more detail hereinbelow.

Figure 12:
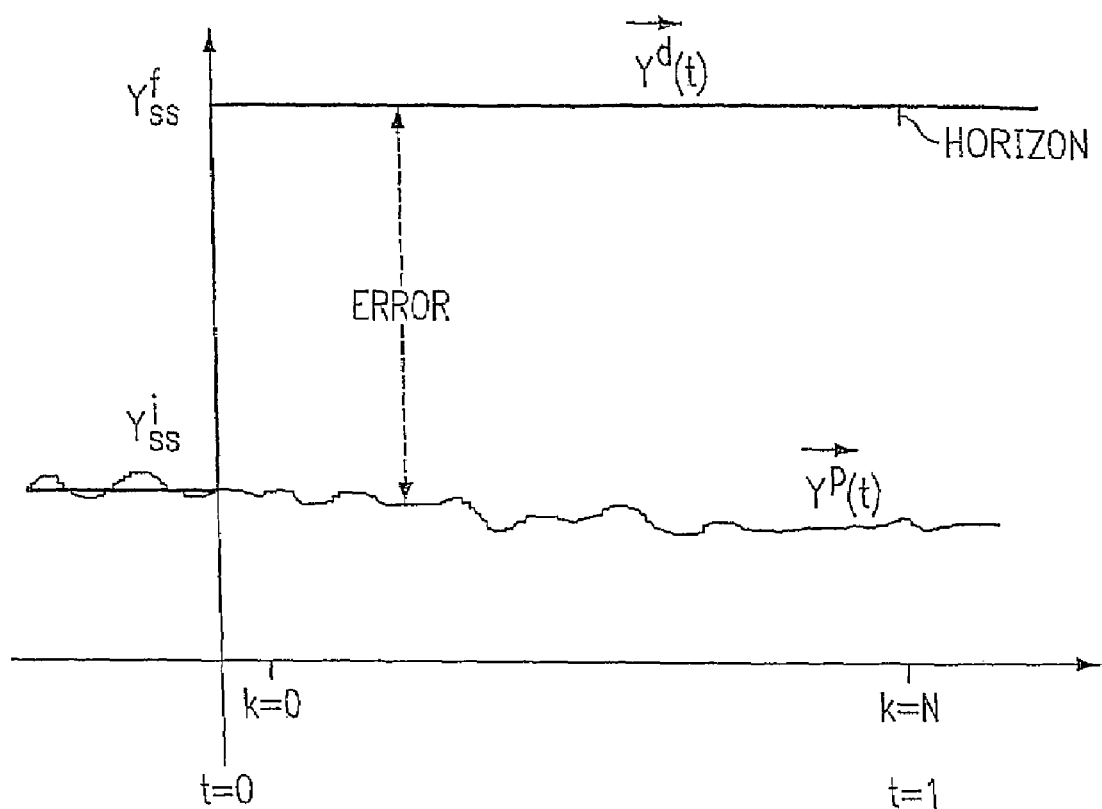
FIG. 12 illustrates a plot depicting desired and predicted behavior.

Referring now to FIG. 12, there is illustrated a plot of $y^d(t)$ and $y^p(t)$. The predicted value is represented by a waveform 170 and the desired output is represented by a waveform 172, both plotted over the horizon between an initial steady-state value $Y^i_{ss}$ and a final steady-state value $Y^f_{ss}$. It can be seen that the desired waveform prior to k=0 is substantially equal to the predicted output. At k=0, the desired output waveform 172 raises its level, thus creating an error. It can be seen that at k=0, the error is large and the system then must adjust the manipulated variables to minimize the error and force the predicted value to the desired value. The objective function for the calculation of error is of the form:

$$\min_{\Delta u_{il}} \sum_j \sum_k \left( A_j * (\vec{y}^p(t) - \vec{y}^d(t)) \right)^2 \qquad (23)$$

where: $Du_{il}$ is the change in input variable (IV) I at time interval l
$A_j$ is the weight factor for control variable (CV) j
$y^p(t)$ is the predicted value of CV j at time interval k
$y^d(t)$ is the desired value of CV j.

Trajectory Weighting

Figure 13:
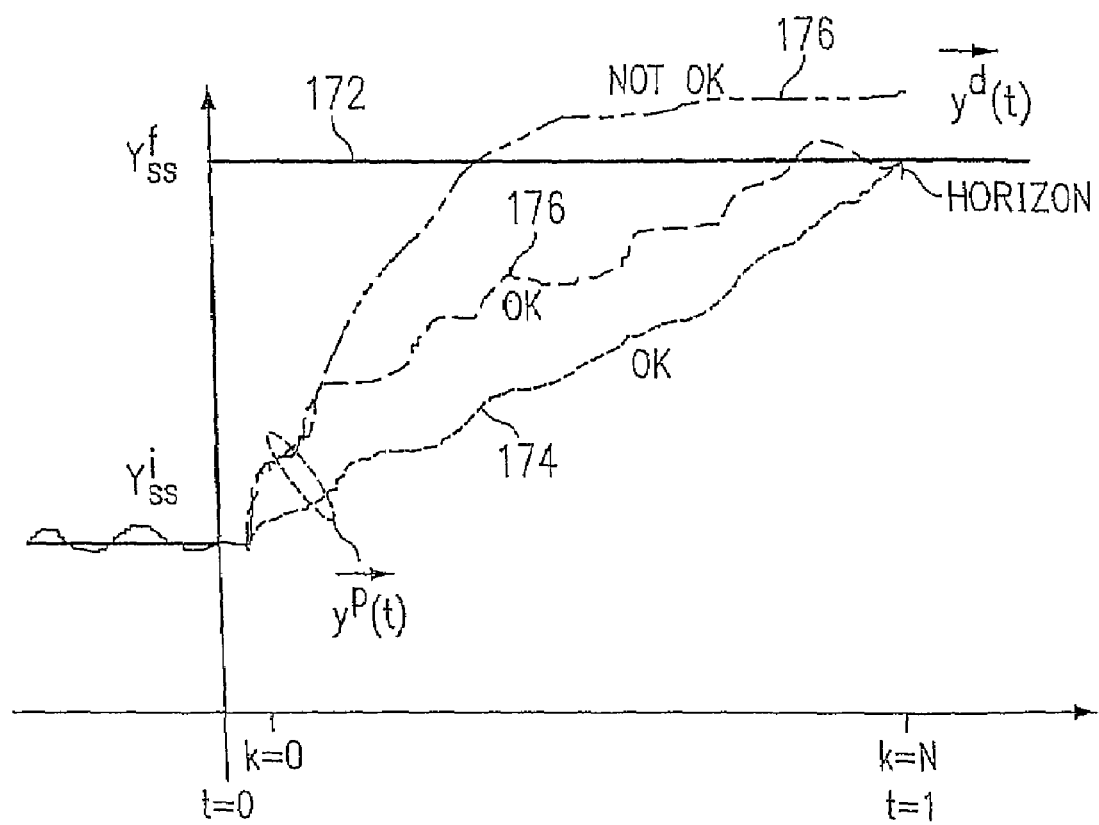
FIG. 13 illustrates various plots for controlling a system to force the predicted behavior to the desired behavior.

The present system utilizes what is referred to as "trajectory weighting" which encompasses the concept that one does not put a constant degree of importance on the future predicted process behavior matching the desired behavior at every future time set, i.e., at low k-values. One approach could be that one is more tolerant of error in the near term (low k-values) than farther into the future (high k-values). The basis for this logic is that the final desired behavior is more important than the path taken to arrive at the desired behavior, otherwise the path traversed would be a step function. This is illustrated in FIG. 13 wherein three possible predicted behaviors are illustrated, one represented by a curve 174 which is acceptable, one is represented by a different curve 176, which is also acceptable and one represented by a curve 178, which is unacceptable since it goes above the desired level on curve 172. Curves 174-178 define the desired behavior over the horizon for k=1 to N.

Figure 14:
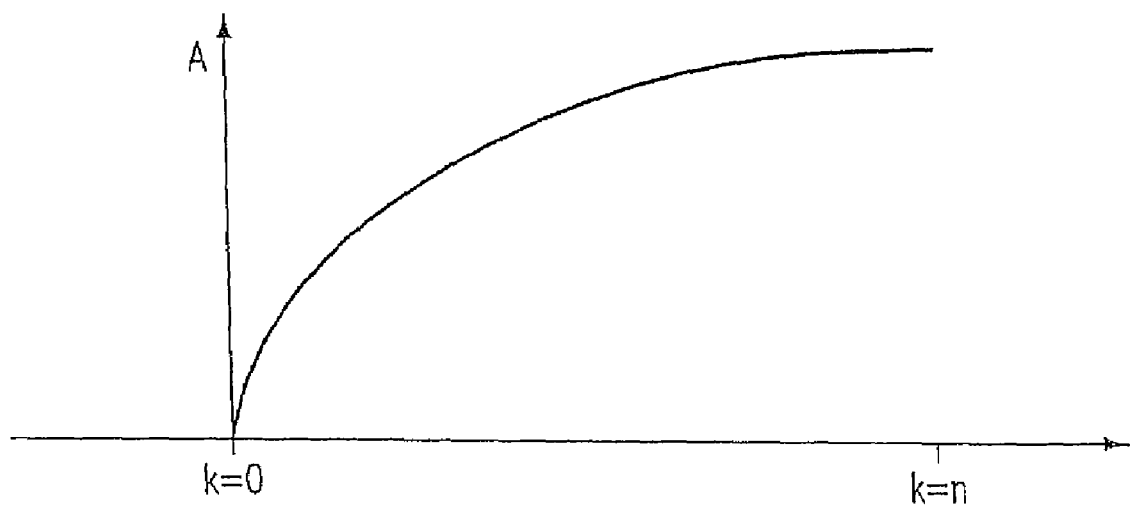
FIG. 14 illustrates a plot of the trajectory weighting algorithm of the present invention.

In Equation 23, the predicted curves 174-178 would be achieved by forcing the weighting factors $A_j$ to be time varying. This is illustrated in FIG. 14. In FIG. 14, the weighting factor A as a function of time is shown to have an increasing value as time and the value of k increases. This results in the errors at the beginning of the horizon (low k-values) being weighted much less than the errors at the end of the horizon (high k-values). The result is more significant than merely redistributing the weights out to the end of the control horizon at k=N. This method also adds robustness, or the ability to handle a mismatch between the process and the prediction model. Since the largest error is usually experienced at the beginning of the horizon, the largest changes in the independent variables will also occur at this point. If there is a mismatch between the process and the prediction (model error), these initial moves will be large and somewhat incorrect, which can cause poor performance and eventually instability. By utilizing the trajectory weighting method, the errors at the beginning of the horizon are weighted less, resulting in smaller changes in the independent variables and, thus, more robustness.

Error Constraints

Figure 15:
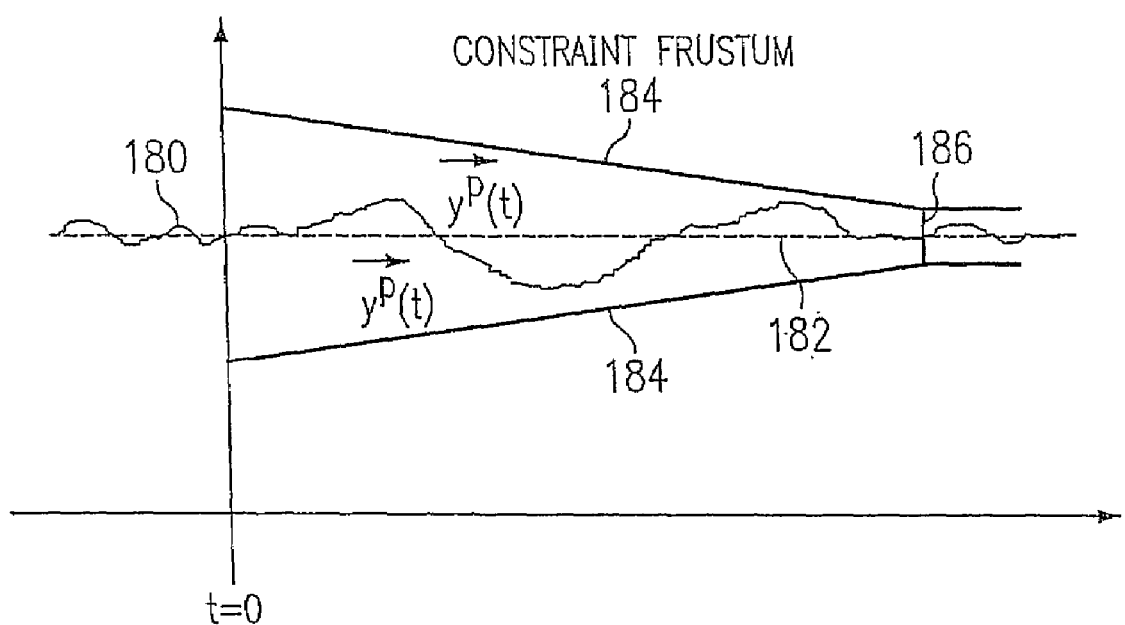
FIG. 15 illustrates a plot for the constraining algorithm.

Referring now to FIG. 15, there are illustrated constraints that can be placed upon the error. There is illustrated a predicted curve 180 and a desired curve 182, desired curve 182 essentially being a flat line. It is desirable for the error between curve 180 and 182 to be minimized. Whenever a transient occurs at t=0, changes of some sort will be required. It can be seen that prior to t=0, curve 182 and 180 are substantially the same, there being very little error between the two. However, after some type of transition, the error will increase. If a rigid solution were utilized, the system would immediately respond to this large error and attempt to reduce it in as short a time as possible. However, a constraint frustum boundary 184 is provided which allows the error to be large at t=0 and reduces it to a minimum level at a point 186. At point 186, this is the minimum error, which can be set to zero or to a non-zero value, corresponding to the noise level of the output variable to be controlled. This therefore encompasses the same concepts as the trajectory weighting method in that final future behavior is considered more important that near term behavior. The ever shrinking minimum and/or maximum bounds converge from a slack position at t=0 to the actual final desired behavior at a point 186 in the constraint frustum method.

The difference between constraint frustums and trajectory weighting is that constraint frustums are an absolute limit (hard constraint) where any behavior satisfying the limit is just as acceptable as any other behavior that also satisfies the limit. Trajectory weighting is a method where differing behaviors have graduated importance in time. It can be seen that the constraints provided by the technique of FIG. 15 requires that the value $y^p(t)$ is prevented from exceeding the constraint value. Therefore, if the difference between $y^d(t)$ and $y^p(t)$ is greater than that defined by the constraint boundary, then the optimization routine will force the input values to a value that will result in the error being less than the constraint value. In effect, this is a "clamp" on the difference between $y^p(t)$ and $y^d(t)$. In the trajectory weighting method, there is no "clamp" on the difference therebetween; rather, there is merely an attenuation factor placed on the error before input to the optimization network.

Trajectory weighting can be compared with other methods, there being two methods that will be described herein, the dynamic matrix control (DMC) algorithm and the identification and command (IdCom) algorithm. The DMC algorithm utilizes an optimization to solve the control problem by minimizing the objective function:

$$\min_{\Delta U_{il}} \sum_j \sum_k \left( A_j * (\vec{y}^P(t) - \vec{y}^D(t)) + \sum_i B_i * \sum_1 (\Delta U_{il})^2 \right) \qquad (24)$$

where $B_i$ is the move suppression factor for input variable I. This is described in Cutler, C. R. and B. L. Ramaker, Dynamic Matrix Control—A Computer Control Algorithm, AIChE National Meeting, Houston, Tex. (April, 1979), which is incorporated herein by reference.

It is noted that the weights $A_j$ and desired values $y^d(t)$ are constant for each of the control variables. As can be seen from Equation 24, the optimization is a trade off between minimizing errors between the control variables and their desired values and minimizing the changes in the independent variables. Without the move suppression term, the independent variable changes resulting from the set point changes would be quite large due to the sudden and immediate error between the predicted and desired values. Move suppression limits the independent variable changes, but for all circumstances, not just the initial errors.

Figure 16:
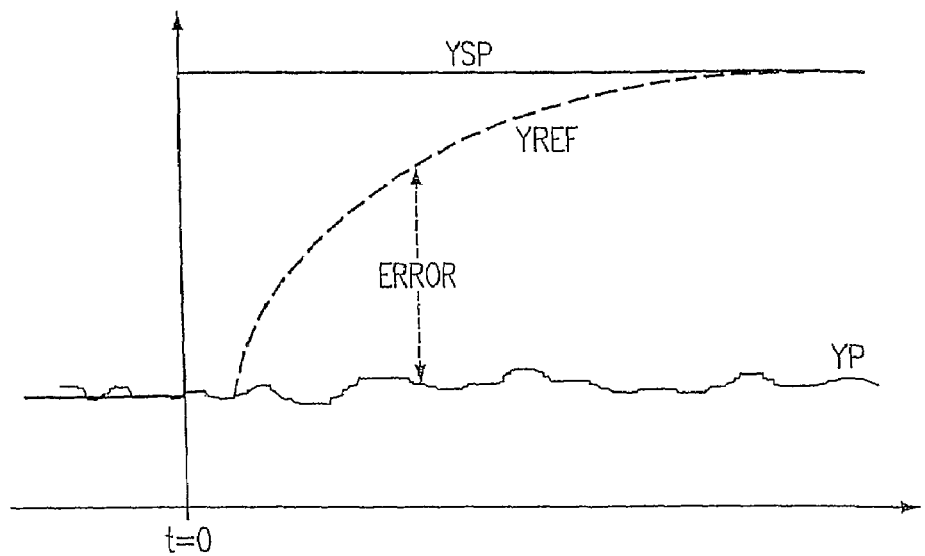
FIG. 16 illustrates a plot of the error algorithm as a function of time.

The IdCom algorithm utilizes a different approach. Instead of a constant desired value, a path is defined for the control variables to take from the current value to the desired value. This is illustrated in FIG. 16. This path is a more gradual transition from one operation point to the next. Nevertheless, it is still a rigidly defined path that must be met. The objective function for this algorithm takes the form:

$$\min_{\Delta U_{jl}} \sum_j \sum_k \left( A_j * \left( Y^{P}{}_{jk} - y_{refjk} \right) \right)^2 \quad (25)$$

This technique is described in Richalet, J., A. Rault, J. L. Testud, and J. Papon, Model Predictive Heuristic Control: Applications to Industrial Processes, Automatica, 14, 413-428 (1978), which is incorporated herein by reference. It should be noted that the requirement of Equation 25 at each time interval is sometimes difficult. In fact, for control variables that behave similarly, this can result in quite erratic independent variable changes due to the control algorithm attempting to endlessly meet the desired path exactly.

Control algorithms such as the DMC algorithm that utilize a form of matrix inversion in the control calculation, cannot handle control variable hard constraints directly. They must treat them separately, usually in the form of a steady-state linear program. Because this is done as a steady-state problem, the constraints are time invariant by definition. Moreover, since the constraints are not part of a control calculation, there is no protection against the controller violating the hard constraints in the transient while satisfying them at steady-state.

With further reference to FIG. 15, the boundaries at the end of the envelope can be defined as described hereinbelow. One technique described in the prior art, W. Edwards Deming, "Out of the Crisis," Massachusetts Institute of Technology, Center for Advanced Engineering Study, Cambridge Mass., Fifth Printing, September 1988, pages 327-329, describes various Monte Carlo experiments that set forth the premise that any control actions taken to correct for common process variation actually may have a negative impact, which action may work to increase variability rather than the desired effect of reducing variation of the controlled processes. Given that any process has an inherent accuracy, there should be no basis to make a change based on a difference that lies within the accuracy limits of the system utilized to control it. At present, commercial controllers fail to recognize the fact that changes are undesirable, and continually adjust the process, treating all deviation from target, no matter how small, as a special cause deserving of control actions, i.e., they respond to even minimal changes. Over adjustment of the manipulated variables therefore will result, and increase undesirable process variation. By placing limits on the error with the present filtering algorithms described herein, only controller actions that are proven to be necessary are allowed, and thus, the process can settle into a reduced variation free from unmerited controller disturbances. The following discussion will deal with one technique for doing this, this being based on statistical parameters.

Filters can be created that prevent model-based controllers from taking any action in the case where the difference between the controlled variable measurement and the desired target value are not significant. The significance level is defined by the accuracy of the model upon which the controller is statistically based. This accuracy is determined as a function of the standard deviation of the error and a predetermined confidence level. The confidence level is based upon the accuracy of the training. Since most training sets for a neural network-based model will have "holes" therein, this will result in inaccuracies within the mapped space. Since a neural network is an empirical model, it is only as accurate as the training data set. Even though the model may not have been trained upon a given set of inputs, it will extrapolate the output and predict a value given a set of inputs, even though these inputs are mapped across a space that is questionable. In these areas, the confidence level in the predicted output is relatively low. This is described in detail in U.S. patent application Ser. No. 08/025,184, filed Mar. 2, 1993, which is incorporated herein by reference.

Figure 17:
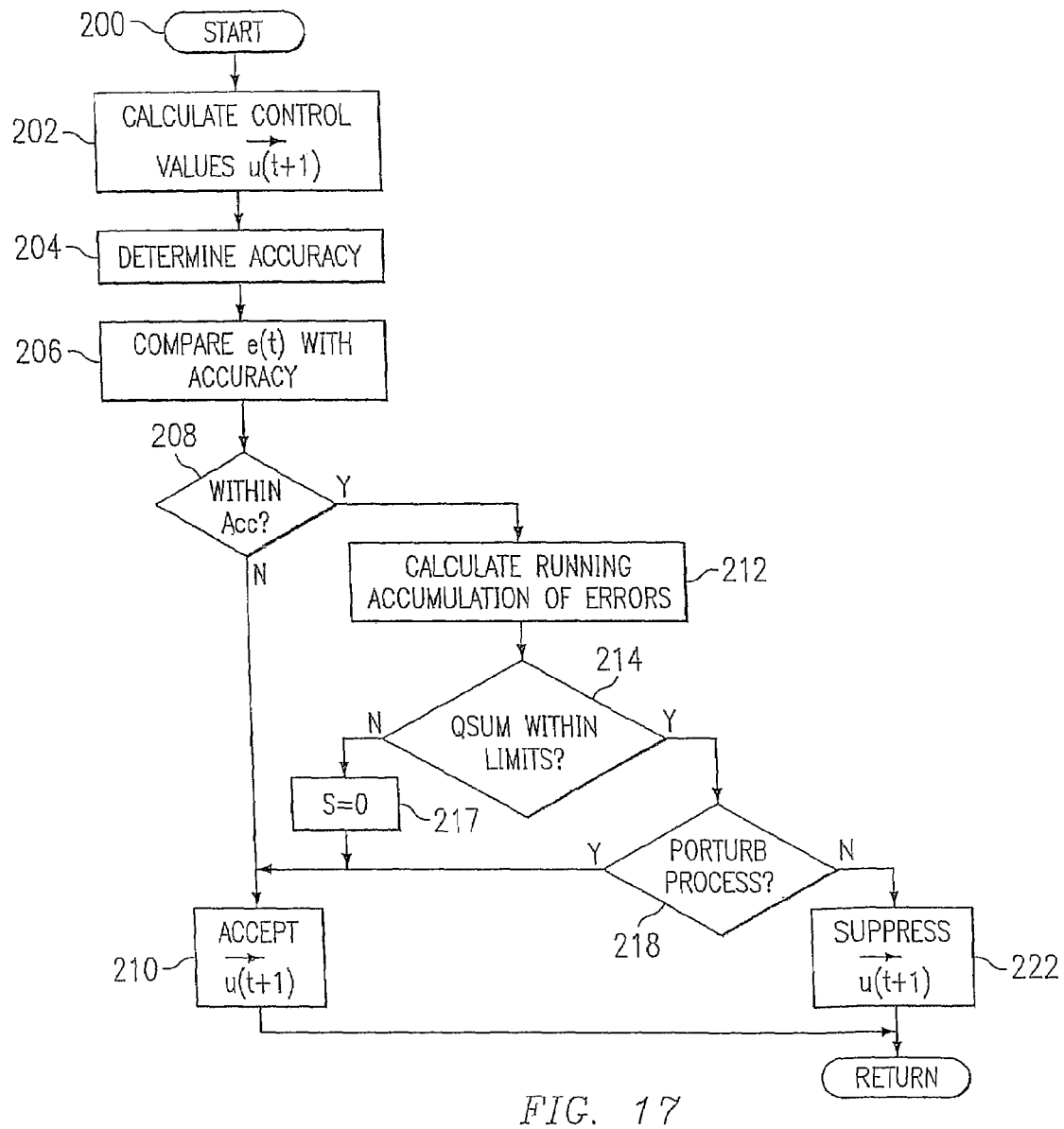
FIG. 17 illustrates a flowchart depicting the statistical method for generating the filter and defining the end point for the constraining algorithm of FIG. 15.

Referring now to FIG. 17, there is illustrated a flowchart depicting the statistical method for generating the filter and defining the end point 186 in FIG. 15. The flowchart is initiated at a start block 200 and then proceeds to a function block 202, wherein the control values u(t+1) are calculated. However, prior to acquiring these control values, the filtering operation must be a processed. The program will flow to a function block 204 to determine the accuracy of the controller. This is done off-line by analyzing the model predicted values compared to the actual values, and calculating the standard deviation of the error in areas where the target is undisturbed. The model accuracy of $e_m(t)$ is defined as follows:

$$e_m(t) = a(t) - p(t) \quad (26)$$

where: $e_m$=model error,
a=actual value
p=model predicted value

The model accuracy is defined by the following equation:

$$Acc = H * \sigma_m \quad (27)$$

where:

$Acc$ = accuracy in terms of minimal detector error $H$ = significance level = 1  67% confidence
= 2  95% confidence
= 3  99.5% confidence $\sigma_m$ = standard deviation of $e_m(t)$.

The program then flows to a function block 206 to compare the controller error $e_c(t)$ with the model accuracy. This is done by taking the difference between the predicted value (measured value) and the desired value. This is the controller error calculation as follows:

$$e_c(t) = d(t) - m(t) \quad (28)$$

where: $e_c$=controller error
d=desired value
m measured value

The program will then flow to a decision block 208 to determine if the error is within the accuracy limits. The determination as to whether the error is within the accuracy limits is done utilizing Shewhart limits. With this type of limit and this type of filter, a determination is made as to whether the controller error $e_c(t)$ meets the following conditions: $e_c(t) \geq -1*Acc$ and $e_c(t) \leq +1*Acc$, then either the control action is suppressed or not suppressed. If it is within the accuracy limits, then the control action is suppressed and the program flows along a "Y" path. If not, the program will flow along the "N" path to function block 210 to accept the u(t+1) values. If the error lies within the controller accuracy, then the program flows along the "Y" path from decision block 208 to a function block 212 to calculate the running accumulation of errors. This is formed utilizing a CUSUM approach. The controller CUSUM calculations are done as follows:

$$S_{low} = \min(0, S_{low}(t-1) + d(t) - m(t)) - \Sigma(m) + k) \quad (29)$$

$$S_{hi} = \max(0, S_{hi}(t-1) + [d(t) - m(t)) - \Sigma(m)] - k) \quad (30)$$

where: $S_{hi}$=Running Positive Qsum
$S_{low}$=Running Negative Qsum
k=Tuning factor–minimal detectable change threshold
with the following defined:
Hq=significance level. Values of (j,k) can be found so that the CUSUM control chart will have significance levels equivalent to Shewhart control charts.

The program will then flow to a decision block 214 to determine if the CUSUM limits check out, i.e., it will determine if the Qsum values are within the limits. If the Qsum, the accumulated sum error, is within the established limits, the program will then flow along the "Y" path. And, if it is not within the limits, it will flow along the "N" path to accept the controller values u(t+1). The limits are determined if both the value of $S_{hi} \geq +1*Hq$ and $S_{low} \leq -1*Hq$. Both of these actions will result in this program flowing along the "Y" path. If it flows along the "N" path, the sum is set equal to zero and then the program flows to the function block 210. If the Qsum values are within the limits, it flows along the "Y" path to a function block 218 wherein a determination is made as to whether the user wishes to perturb the process. If so, the program will flow along the "Y" path to the function block 210 to accept the control values u(t+1). If not, the program will flow along the "N" path from decision block 218 to a function block 222 to suppress the controller values u(t+1). The decision block 218, when it flows along the "Y" path, is a process that allows the user to re-identify the model for on-line adaptation, i.e., retrain the model. This is for the purpose of data collection and once the data has been collected, the system is then reactivated.

Figure 18:
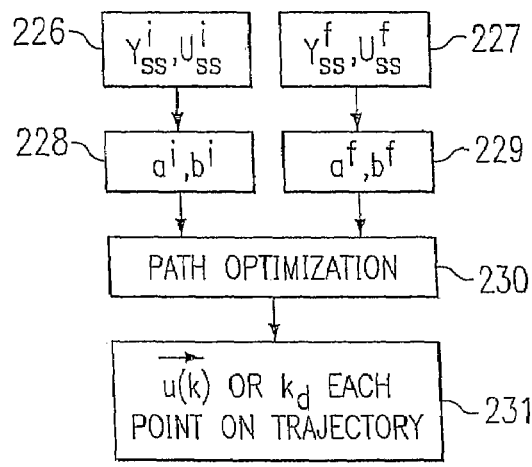
FIG. 18 illustrates a diagrammatic view of the optimization process.

Referring now to FIG. 18, there is illustrated a block diagram of the overall optimization procedure. In the first step of the procedure, the initial steady-state values $\{Y_{ss}^i, U_{ss}^i\}$ and the final steady-state values $\{Y_{ss}^f, U_{ss}^f\}$ are determined, as defined in blocks 226 and 228, respectively. In some calculations, both the initial and the final steady-state values are required. The initial steady-state values are utilized to define the coefficients $a^i$, $b^i$ in a block 228. As described above, this utilizes the coefficient scaling of the b-coefficients. Similarly, the steady-state values in block 228 are utilized to define the coefficients $a^f$, $b^f$, it being noted that only the b-coefficients are also defined in a block 229. Once the beginning and end points are defined, it is then necessary to determine the path therebetween. This is provided by block 230 for path optimization. There are two methods for determining how the dynamic controller traverses this path. The first, as described above, is to define the approximate dynamic gain over the path from the initial gain to the final gain. As noted above, this can incur some instabilities. The second method is to define the input values over the horizon from the initial value to the final value such that the desired value $Y_{ss}^f$ is achieved. Thereafter, the gain can be set for the dynamic model by scaling the b-coefficients. As noted above, this second method does not necessarily force the predicted value of the output $y^p(t)$ along a defined path; rather, it defines the characteristics of the model as a function of the error between the predicted and actual values over the horizon from the initial value to the final or desired value. This effectively defines the input values for each point on the trajectory or, alternatively, the dynamic gain along the trajectory.

Figure 18A:
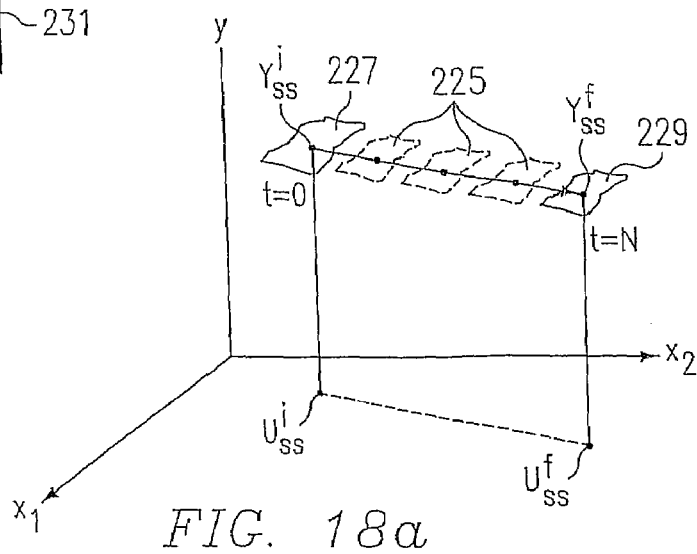
FIG. 18a illustrates a diagrammatic representation of the manner in which the path between steady-state values is mapped through the input and output space.

Referring now to FIG. 18a, there is illustrated a diagrammatic representation of the manner in which the path is mapped through the input and output space. The steady-state model is operable to predict both the output steady-state value $Y_{ss}^i$ at a value of k=0, the initial steady-state value, and the output steady-state value $Y_{ss}^i$ at a time t+N where k=N, the final steady-state value. At the initial steady-state value, there is defined a region 227, which region 227 comprises a surface in the output space in the proximity of the initial steady-state value, which initial steady-state value also lies in the output space. This defines the range over which the dynamic controller can operate and the range over which it is valid. At the final steady-state value, if the gain were not changed, the dynamic model would not be valid. However, by utilizing the steady-state model to calculate the steady-state gain at the final steady-state value and then force the gain of the dynamic model to equal that of the steady-state model, the dynamic model then becomes valid over a region 229, proximate the final steady-state value. This is at a value of k=N. The problem that arises is how to define the path between the initial and final steady-state values. One possibility, as mentioned hereinabove, is to utilize the steady-state model to calculate the steady-state gain at multiple points along the path between the initial steady-state value and the final steady-state value and then define the dynamic gain at those points. This could be utilized in an optimization routine, which could require a large number of calculations. If the computational ability were there, this would provide a continuous calculation for the dynamic gain along the path traversed between the initial steady-state value and the final steady-state value utilizing the steady-state gain. However, it is possible that the steady-state model is not valid in regions between the initial and final steady-state values, i.e., there is a low confidence level due to the fact that the training in those regions may not be adequate to define the model therein. Therefore, the dynamic gain is approximated in these regions, the primary goal being to have some adjustment of the dynamic model along the path between the initial and the final steady-state values during the optimization procedure. This allows the dynamic operation of the model to be defined. This is represented by a number of surfaces 225 as shown in phantom.

Figure 19:
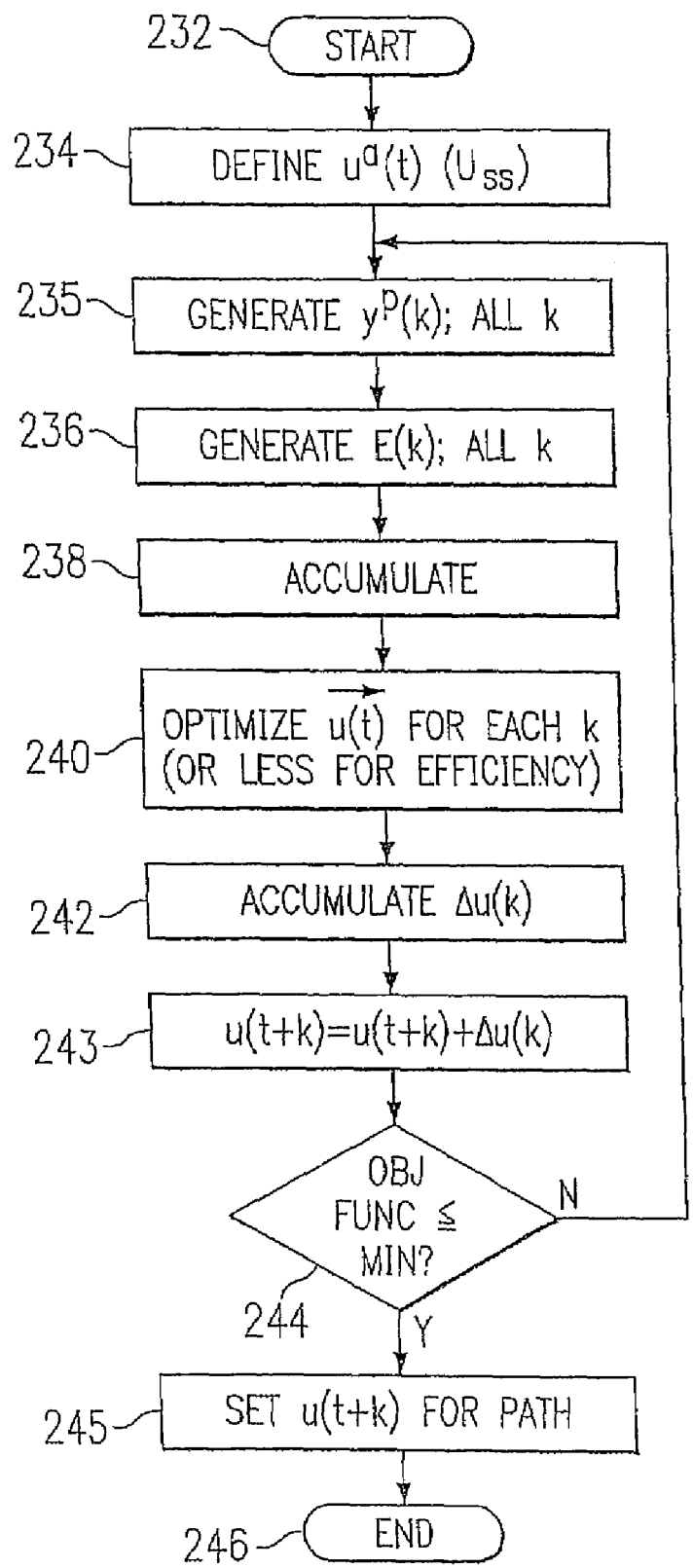
FIG. 19 illustrates a flowchart for the optimization procedure.

Referring now to FIG. 19, there is illustrated a flow chart depicting the optimization algorithm. The program is initiated at a start block 232 and then proceeds to a function block 234 to define the actual input values $u^a(t)$ at the beginning of the horizon, this typically being the steady-state value $U_{ss}$. The program then flows to a function block 235 to generate the predicted values $y^p(k)$ over the horizon for all k for the fixed input values. The program then flows to a function block 236 to generate the error E(k) over the horizon for all k for the previously generated $y^p(k)$. These errors and the predicted values are then accumulated, as noted by function block 238. The program then flows to a function block 240 to optimize the value of u(t) for each value of k in one embodiment. This will result in k-values for u(t). Of course, it is sufficient to utilize less calculations than the total k-calculations over the horizon to provide for a more efficient algorithm. The results of this optimization will provide the predicted change $\Delta u(t+k)$ for each value of k in a function block 242. The program then flows to a function block 243 wherein the value of u(t+k) for each u will be incremented by the value $\Delta u(t+k)$. The program will then flow to a decision block 244 to determine if the objective function noted above is less than or equal to a desired value. If not, the program will flow back along an "N"

path to the input of function block 235 to again make another pass. This operation was described above with respect to FIGS. 11*a* and 11*b*. When the objective function is in an acceptable level, the program will flow from decision block 244 along the "Y" path to a function block 245 to set the value of u(t+k) for all u. This defines the path. The program then flows to an End block 246.

Steady State Gain Determination

Figure 20:
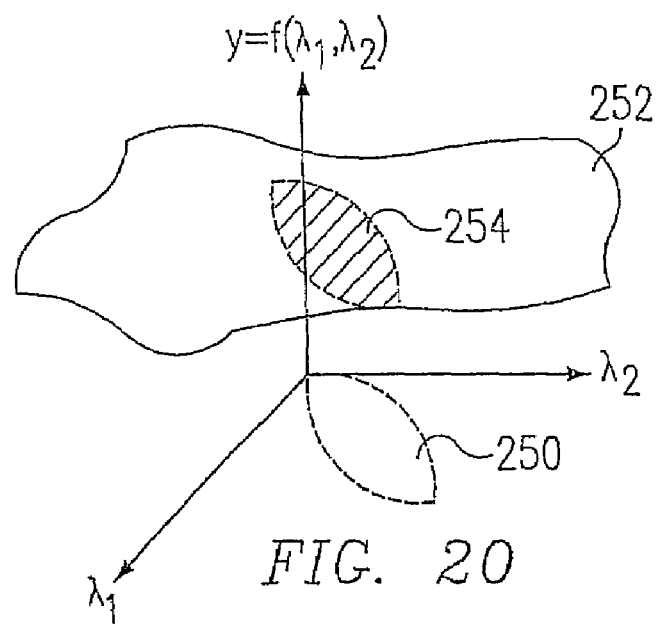
FIG. 20 illustrates a diagrammatic view of the input space and the error associated therewith.
Figure 21:
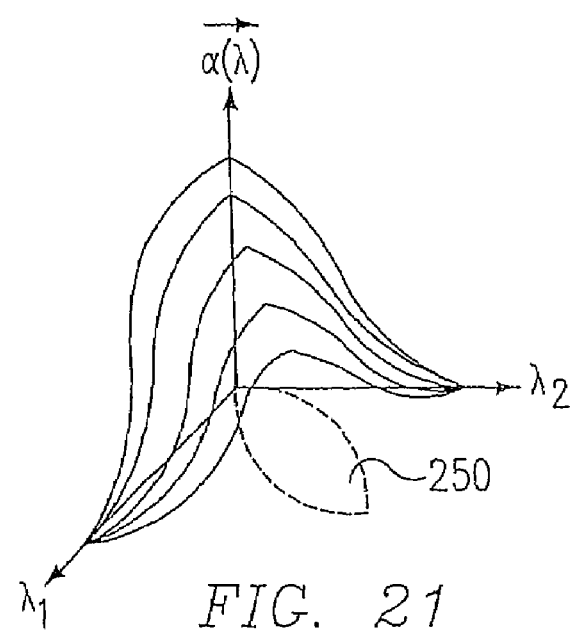
FIG. 21 illustrates a diagrammatic view of the confidence factor in the input space.

Referring now to FIG. 20, there is illustrated a plot of the input space and the error associated therewith. The input space is comprised of two variables $x_1$ and $x_2$. The y-axis represents the function $f(x_1, x_2)$. In the plane of $x_1$ and $x_2$, there is illustrated a region 250, which represents the training data set. Areas outside of the region 250 constitute regions of no data, i.e., a low confidence level region. The function Y will have an error associated therewith. This is represented by a plane 252. However, the error in the plane 250 is only valid in a region 254, which corresponds to the region 250. Areas outside of region 254 on plane 252 have an unknown error associated therewith. As a result, whenever the network is operated outside of the region 250 with the error region 254, the confidence level in the network is low. Of course, the confidence level will not abruptly change once outside of the known data regions but, rather, decreases as the distance from the known data in the training set increases. This is represented in FIG. 21 wherein the confidence is defined as α(x). It can be seen from FIG. 21 that the confidence level α(x) is high in regions overlying the region 250.

Once the system is operating outside of the training data regions, i.e., in a low confidence region, the accuracy of the neural net is relatively low. In accordance with one aspect of the preferred embodiment, a first principles model g(x) is utilized to govern steady-state operation. The switching between the neural network model f(x) and the first principle models g(x) is not an abrupt switching but, rather, it is a mixture of the two.

The steady-state gain relationship is defined in Equation 7 and is set forth in a more simple manner as follows:

$$K(\vec{u}) = \frac{\partial(f(\vec{u}))}{\partial(\vec{u})} \quad (31)$$

A new output function Y(u) is defined to take into account the confidence factor α(u) as follows:

$$Y(\vec{u}) = \alpha(\vec{u}) \cdot f(\vec{u}) + (1-\alpha(\vec{u}))g(\vec{u}) \quad (32)$$

where: α(u)=confidence in model f(u)

α(u) in the range of 0→1

α(u)∈{0,1}

This will give rise to the relationship:

$$K(\vec{u}) = \frac{\partial(Y(\vec{u}))}{\partial(\vec{u})} \quad (33)$$

In calculating the steady-state gain in accordance with this Equation utilizing the output relationship Y(u), the following will result:

$$K(\vec{u}) = \frac{\partial(\alpha(\vec{u}))}{\partial(\vec{u})} \times F(\vec{u}) + \alpha(\vec{u}) \frac{\partial(F(\vec{u}))}{\partial(\vec{u})} + \frac{\partial(1-\alpha(\vec{u}))}{\partial(\vec{u})} \times g(\vec{u}) + (1-\alpha(\vec{u})) \frac{\partial(g(\vec{u}))}{\partial(\vec{u})} \quad (34)$$

Figure 22:
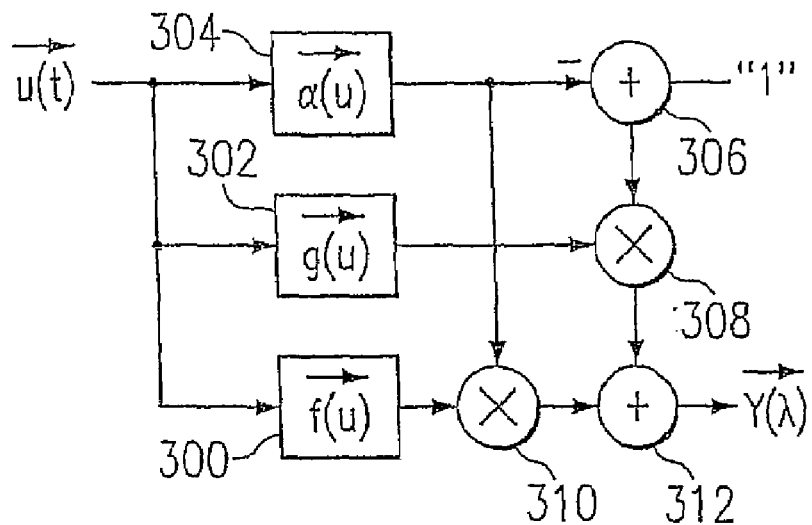
FIG. 22 illustrates a block diagram of the method for utilizing a combination of a non-linear system and a first principal system.

Referring now to FIG. 22, there is illustrated a block diagram of the embodiment for realizing the switching between the neural network model and the first principles model. A neural network block 300 is provided for the function f(u), a first principle block 302 is provided for the function g(u) and a confidence level block 304 for the function α(u). The input u(t) is input to each of the blocks 300-304. The output of block 304 is processed through a subtraction block 306 to generate the function 1−α(u), which is input to a multiplication block 308 for multiplication with the output of the first principles block 302. This provides the function (1−α(u))*g(u). Additionally, the output of the confidence block 304 is input to a multiplication block 310 for multiplication with the output of the neural network block 300. This provides the function f(u)*α(u). The output of block 308 and the output of block 310 are input to a summation block 312 to provide the output Y(u).

Figure 23:
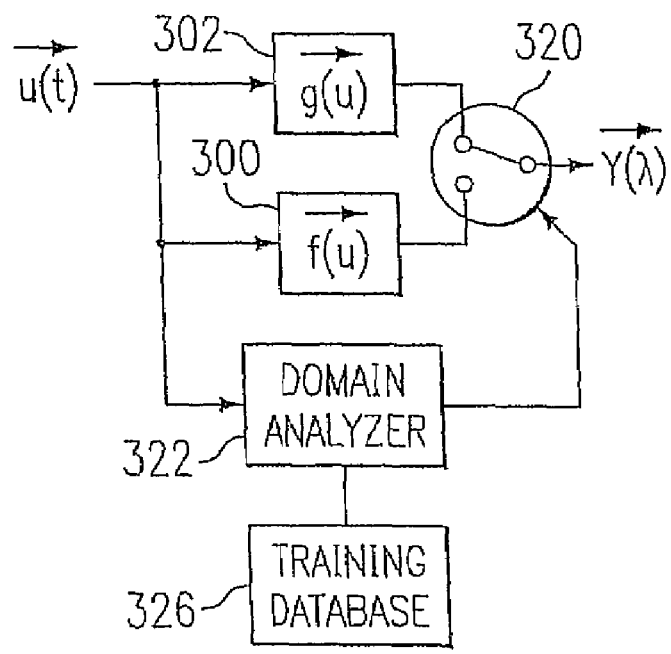
FIG. 23 illustrates an alternate embodiment of the embodiment of FIG. 22.

Referring now to FIG. 23, there is illustrated an alternate embodiment which utilizes discreet switching. The output of the first principles block 302 and the neural network block 300 are provided and are operable to receive the input x(t). The output of the network block 300 and first principles block 302 are input to a switch 320, the switch 320 operable to select either the output of the first principals block 302 or the output of the neural network block 300. The output of the switch 320 provides the output Y(u).

The switch 320 is controlled by a domain analyzer 322. The domain analyzer 322 is operable to receive the input x(t) and determine whether the domain is one that is within a valid region of the network 300. If not, the switch 320 is controlled to utilize the first principles operation in the first principles block 302. The domain analyzer 322 utilizes the training database 326 to determine the regions in which the training data is valid for the network 300. Alternatively, the domain analyzer 320 could utilize the confidence factor α(u) and compare this with a threshold, below which the first principles model 302 would be utilized.

Although the preferred embodiment has been described in detail, it should be understood that various changes, substitutions and alterations can be made therein without departing from the spirit and scope of the invention as defined by the appended claims.

Further Embodiments

For nonlinear systems, process gain may be a determining characteristic of the systems, and may vary significantly over their respective operating regions. However, in systems where the process gain has little variance, the system may be represented by a linearization of the process model. In various embodiments, the linearization may be local and/or global. For example, a global linearization may be desirable in systems where the process gains do not vary significantly over the entire operation range. Alternatively, for systems that are significantly nonlinear over the entire operation range, a local linearization may be used about a specific operating point, e.g., at a first time, such as the current operating point or some other desired operating point. Note that the accuracy of the linearization may depend on the nonlinearity of the system and may be defined based on how much the operating conditions differ from those represented in the model, i.e., in the linearization. Since the linear approximation does contain some error, it is desirable from a process control standpoint to choose a well-understood linearization. For example, in one case, it may be more desirable to have the error be small at the current operating point (at the first time) at the expense of larger error at future operating points. In another case it may be desirable to have the error be small at the desired final operating point, e.g., at a second time, at the expense of a larger error at the current operating point. Alternatively, it may be desirable to distribute the error so that it is more or less equal across the entire operating region. In general, the linearization may be any function of the gain at the current point, the desired final point, and the intermediate operating points.

For example, in one embodiment, the linearization may be based on a simple or weighted average between gains at two or more operating points, e.g., between the gain at the current point and the final point. In some embodiments, gains may be approximated by a linear interpolation between a first gain, e.g., at the current operating point, and a later gain, e.g., at the final destination point. Note that in some embodiments the linearization may be based on a single operating point, or, alternatively, a plurality of operating points, in the operating region.

In some embodiments, it may be desirable for model based process controllers to utilize process gains that are larger in magnitude than the actual process gain, i.e., of the actual plant or process. More specifically, because the size of a control move, e.g., move(s) in response to determined offset(s) from target operation value(s), may be based on a multiplication of error and the inverse of the process gain, larger process gain values may be implemented in order to restrict the size of the control move. Thus, a larger process gain will result in smaller control moves, which, in turn, cause smaller adjustments and disruptions to the operation of the plant or process. Thus, in some embodiments, the gain may be based on the largest absolute value of the gains at one or more operating points, such as the first and the last gain in the change of operation.

Note that the approximation methods described above regarding the process gains are not limited to simple linear approximations, but, in fact, may be approximated via nonlinear methods as well, such as, for example, a nonlinear interpolation between two gains in the operating region, e.g., the gain at the current operating point and the desired final operating point.

Thus, the system may be modeled using various approximation methods, e.g., based on global and/or local linear approximations of dynamic gains based on gains at two operating points.

In some embodiments, the ratio of the gain at the current point and the desired final operating point, e.g., at first and second times, respectively, may be used to measure the nonlinearity of the system. Because a more nonlinear system will, in general, be subject to more modeling error, it may be desirable to configure or control other parameters of the process control system based on the degree of nonlinearity. In some embodiments, as indicated above, the error may be attenuated as a function of time, and/or of gain values associated therewith, between the current operating point and the desired final operating point. Alternatively, or additionally, the amount of attenuation may be modified according to the nonlinearity of the system, e.g., a high attenuation may be used when the model is more nonlinear and correspondingly more prone to modeling error. In some embodiments, a higher attenuation may also result in small control moves as the importance of the control error may be reduced. Conversely, low attenuation may be used when the model is more linear and so less prone to modeling error. In various embodiments, the attenuation may be modified or adjusted according to various methods. For example, similar to above, the attenuation may be based on the values of gain at a first operating point, e.g., at the first time, and a later operating point, e.g., at the second time. Also similar to the above descriptions regarding model approximations, the attenuation may be based on a simple or weighted average of, a largest absolute value of, a linear or nonlinear interpolation between, and/or simply an operational point value of, one or more properties of values between the current operating point and the desired final operating point inclusively, e.g., the gains of these values, among others.

Thus, the error may be attenuated according to various methods to facilitate smoother transitions between operating points of a plant or process.

In some embodiments, the system may have an inherent accuracy, e.g., the difference between the behavior of the actual system (plant or process) and the model of that system, which may be determined by comparison of values of the model with actual process values. If the system is changing dramatically in a nonlinear manner, and the corresponding model is also changing in a nonlinear manner, it can generally be expected that the accuracy will be lower than if the system and model are changing linearly.

Correspondingly, in some embodiments, the system may include an error tolerance level. For example, if the system is within a specified tolerance level of the desired operating point as measured from the plant or process and/or as predicted the model, no further control adjustments may be implemented, e.g., via a filter in the error minimization device described above, because the model may not be accurate enough to resolve small differences in the system. For a highly nonlinear system, this tolerance level may vary depending on the degree of nonlinearity. For example, as the nonlinearity increases, the model accuracy may decrease, and a larger tolerance may be justified. Thus, the accuracy of the model, as determined from the gain values, may determine whether or not the error minimization device is used or employed, e.g., may act as a filter regarding operation of the error minimization device.

In one embodiment, the degree of nonlinearity and/or the tolerance may be based on the dynamic gains at a first and second time, e.g., as a function of the gains at these respective times. In some embodiments, the degree of nonlinearity and/or tolerance may based on a function of the dynamic gain k as the system moves from one operating point to another operating point, e.g., the ratio of the gains, and/or magnitude of the gains, among others, at the first and second times. Note that the various approximation and error attenuation methods described above may also be applied to the determination of the degree of nonlinearity and/or tolerance, e.g., via simple and weighted averages, largest absolute values, linear and/or nonlinear interpolations, one or more operational point values, among others, e.g., of or between the gains at the first and second operating point values inclusively.

Note further that each of these methods may also be applied in determining an error constraint, e.g., an error frustum, for the model, e.g., such as those already described herein. More specifically, the error constraint may be used for imposing a constraint on the objective function, e.g., a hard and/or soft constraint. Thus, when the error is greater than the error constraint, the constraint may be "activated" in the objective function, i.e., a scalar factor may be applied to the constraint as a weight for error minimization. Similar to above, the error constraint may be based on operational point values, or properties thereof, at various points in time, e.g., such as the first and second times described above. Thus, similar to above, the error constraint may be based on the gains at the first and second times, e.g., via simple and weighted averages, ratios, e.g., of the first and second respective gains, largest absolute values, linear and/or nonlinear interpolations, one or more specific gain values, one or more magnitudes of the gains, etc.

Thus, the error of the model may be minimized via various constraints, filters, and/or other methods.

Linearization of the First Principles Model

As described above, a first principles model may be utilized to provide a calculated (i.e., analytic) representation of the plants or processes described above, among others. More specifically, the first principles model may be used to model the plant or process when the input value falls within a region of space having an integrity (e.g., accuracy) that is less than a specified threshold. For example, the first principles model may be used when the input values lie outside of the training domain (described in more detail below). As used herein the term "integrity" is intended to include the accuracy of the model at the current local input space. In other words the integrity may indicate the level of confidence associated with the model at the current input value.

In general, the first principles model may be a set of mathematical equations that describe the physics/chemistry of the plant and/or process being modeled. While these equations attempt to encompass or embody the laws of nature, in some cases, there may be some associated inaccuracy. These inaccuracies may result from several aspects of the first principles model—the most notable being simplifications imposed in the model. For example, in an oil refinery, crude oil is actually a mixture of dozens of hydrocarbon compounds rather than a homogenous liquid. A complete first principles model may contain equations for each of these compounds that define their respective heat and material balances. As an approximation, the crude oil can be defined as a much smaller number of pseudo-components, where each pseudo-component represents a set of true compounds. Correspondingly, the properties of a pseudo-component may represent the combined properties of the true compounds. This approximation may greatly reduce the number of equations in the first principles model, making it more usable from a practical sense in that it may be executed over a shorter time period. However, as indicated above, this approximation may introduce some inaccuracy into the first principles model.

Another example of simplifications implemented in first principles models involves the equations of the models. For example, the first principles model may not reflect the true behavior of the system. As a specific example in a plant, the equations of the model may not explicitly address heat losses from pipes and vessels, or they may not account for non-ideal mixing of compounds, among other behaviors. Because of these simplifications, the physical parameters in the equations that should represent concepts, e.g., heat capacities or reaction rate constants, often may not match their theoretical values. Instead, the first principles model may have physical parameters that have been "fitted" to match actual operational performance. Since the fitted parameters correspond to a particular time and operation, they may or may not accurately model the behavior at other times and operations of the plant or process.

Since the first principles model may contain some approximations and inaccuracies, a simpler linearized representation may sometimes be utilized without greatly degrading the accuracy of the model. In various embodiments, the first principles model may be linearized according to numerous appropriate linearization methods. For example, in one embodiment, the first principles model may be linearized locally, e.g., with respect to the current input value. In other words, when the linearized first principles model is used, it may be linearized according to the local input space of the input that is currently being modeled. As used herein "local input space" is intended to include the input space near a variable or input. For example, the local input space of an input value may include a region that encompasses the input value as well as a region of adjacent values. Additionally, or alternatively, the first principles model may be linearized globally, e.g., across the range of past input values. In some embodiments, the first principles model may be linearized across various other ranges, e.g., intermediate ranges (e.g., including or near the current local input space), dynamically generated ranges, user-defined ranges, and/or other ranges. Thus, according to various embodiments, the first principles model may be linearized using various methods, such as those described above, among others.

In some embodiments, in some input data ranges, the linearized first principles model may have better properties than the first principles model, e.g., for process control purposes, in that it may behave in a more understandable/predictable manner. A linearized version of the first principles model may thus provide a necessary substitute model to use when the non-linear model does not adequately represent the operating region of interest. The combination of the non-linear model, i.e., the data derived model, for the portion of the operating space that is well represented by the data and a linearized first principles model for the remaining portion of the operating space may provide a superior combined model for use in model based dynamic control applications.

In particular, in some embodiments, the linearized first principles model may be used according to the threshold-related embodiments described above. For example, the linearized first principles model may be used in a similar manner as the embodiments described above with regard to FIG. 23, e.g., by substituting the first principles model in the figure with the linearized first principles model described above. However, it should be noted that the threshold-related embodiments are not limited to these descriptions and that other methods and uses are envisioned. The following sections provide exemplary embodiments which may utilize the linearized first principles model.

Figure 24A:
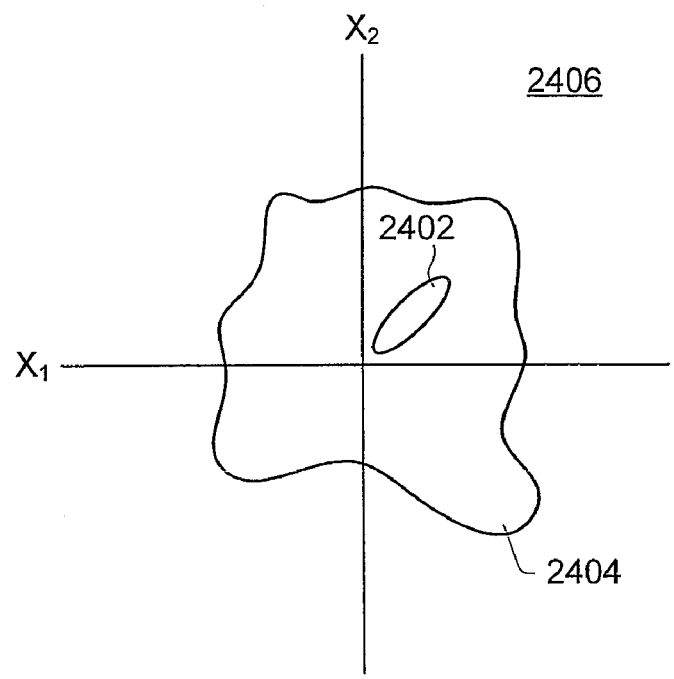
FIG. 24A illustrates exemplary domains in an input space according to one embodiment.
Figure 24B:
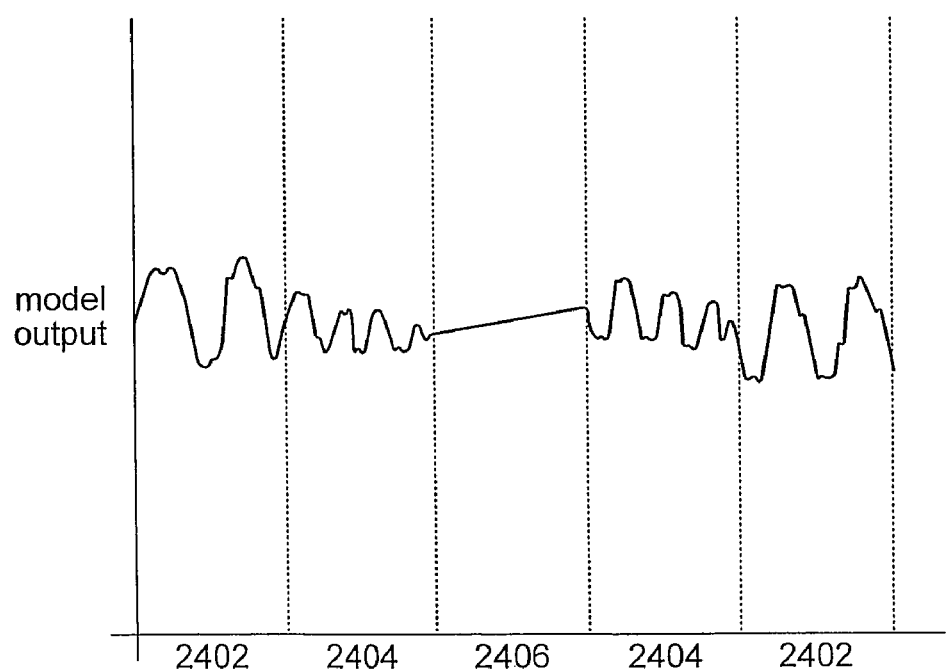
FIG. 24B illustrates an exemplary graph of model outputs over an input space according to one embodiment.

FIGS. 24A and 24B—Exemplary Regions in an Input Space

FIG. 24A is a graph of exemplary regions 2402, 2404, and 2406, in an input space of variables $x_1$ and $x_2$. Note that the variables $x_1$ and $x_2$ are exemplary and are provided as an illustrative example only; in fact, other dimensions, variables, and spaces are envisioned. In one embodiment, the region 2402 may represent the local input space where the model, e.g., the non-linear (i.e., empirical) model, has been trained. Additionally, the region 2404 may represent a local input space where the non-linear model has not been trained, but may still retain some accuracy; finally, the region 2406 may represent a local input space where the trained model no longer has adequate integrity/accuracy. Correspondingly, in some embodiments, different models, e.g., a first principles model, or a linearized first principles model, may be used in one or both of the regions 2404 and 2406.

In some embodiments, the domain analyzer may be operable to determine whether the integrity (e.g., accuracy) of the model associated with the space of the input value is below a certain threshold (e.g., if the space is outside of the region 2402 and/or 2404). Correspondingly, the domain switching device, e.g., a controller, may be operable to choose between the non-linear model and the linearized first principles model.

More specifically, in one embodiment, the domain switching device may use the non-linear model when the integrity is above the threshold and use the linearized first principles model when the integrity is below the threshold value.

Following the descriptions above, in one embodiment, the domain analyzer may be operable to determine whether the local input space is within the region 2402 (which may correspond to the integrity described above). In such situations, the domain switching device may use the non-linear model; however, where the local input space of the current input is outside of the region 2402, i.e., where the model's integrity or accuracy is inadequate, the domain switching device may use the linearized first principles model. Thus, according to one embodiment, the non-linear model may be used where the local input space is within the region 2402, and the linearized first principles model may be used where the local input space is outside of the region 2402.

Alternatively, the domain switching device may choose the non-linear model for the local input space inside of the regions 2402 and 2404 and choose the linearized first principles model when the local input space is outside of the regions 2402 and 2404 (i.e., in the 2406 region). Thus, in some embodiments, the domain switching device may determine whether to use the non-linear model or the linearized first principles model based on a threshold and/or local input space domain, among others.

In some embodiments, the domain switching device may use a plurality of threshold values. For example, the domain switching device may use a first threshold value to determine whether to use the non-linear model or the first principles model and a second threshold value to determine when to use the first principles model or the linearized first principles model. Said another way, the domain switching device determine that the non-linear model should be used when the integrity is higher than a first threshold value, the first principles model should be used when the integrity is greater than a second threshold value, and the linearized first principles model should be used when the integrity is less than the second threshold value. In other words, in one embodiment, the non-linear model may be used in training domains, e.g., where the model has high-confidence, the first principles model may be used outside of the training domains where there is moderate confidence, and the linearized first principles model may be used in domains where there is low confidence/accuracy.

Following the descriptions above regarding FIG. 24, the domain analyzer may determine whether the local input space falls within the region 2402, the region 2404, or the region 2406. Correspondingly, the domain switching device, e.g., the controller, may use the non-linear model for the region 2402, the first principles model for the region 2404, and the linearized first principles model for the region 2406. Thus, the integrity associated with the space or domain of the input value may be used to determine which model to use, e.g., according to the integrity of the model associated with the space of the input values.

FIG. 24B is another graph which corresponds to the exemplary regions 2402, 2404, and 2406 described above. In this graph, the x axis represents the input space for the variable $x_1$, and the y axis represents an output of the predictive system, i.e., of a model. As shown, and following the descriptions above, in the first section of the graph, the value of the variable $x_1$ remains in the region 2402 and so the non-linear model may be used. In this section, the output of the model may have a smaller step size and may change with respect to $x_1$ more rapidly. In other words, since the non-linear model has been trained over this section of data, the predictive system may be able to more accurately predict values and may correspondingly change quickly over time, e.g., according to the previous training of the model. In the second section, the value of the variable $x_1$ is in the region 2404 where the first principles model may be used. As shown in this section, the output of the predictive system may change less over time due to the lower accuracy of the model. In the third section, in the region 2406, the linearized first principles model may be used. As shown, the output of the predictive system in this section may be a simple line, e.g., because of the low integrity of the non-linear and first principles models in this region. In the fourth section, the local input space may be within the region 2404 and the first principles model may be used, and in the fifth section, $x_1$ may enter the region 2402 and the non-linear model may be used. Note that the descriptions above may also apply to systems where only two regions, e.g., one threshold, are used. In these systems the regions 2402/2404 may be consolidated in the graphs/predictive systems.

Thus, according to various embodiments, the non-linear model, the first principles model, and/or the linearized first principles model may be used, e.g., according to the accuracy or integrity of the model(s).

Figure 25:
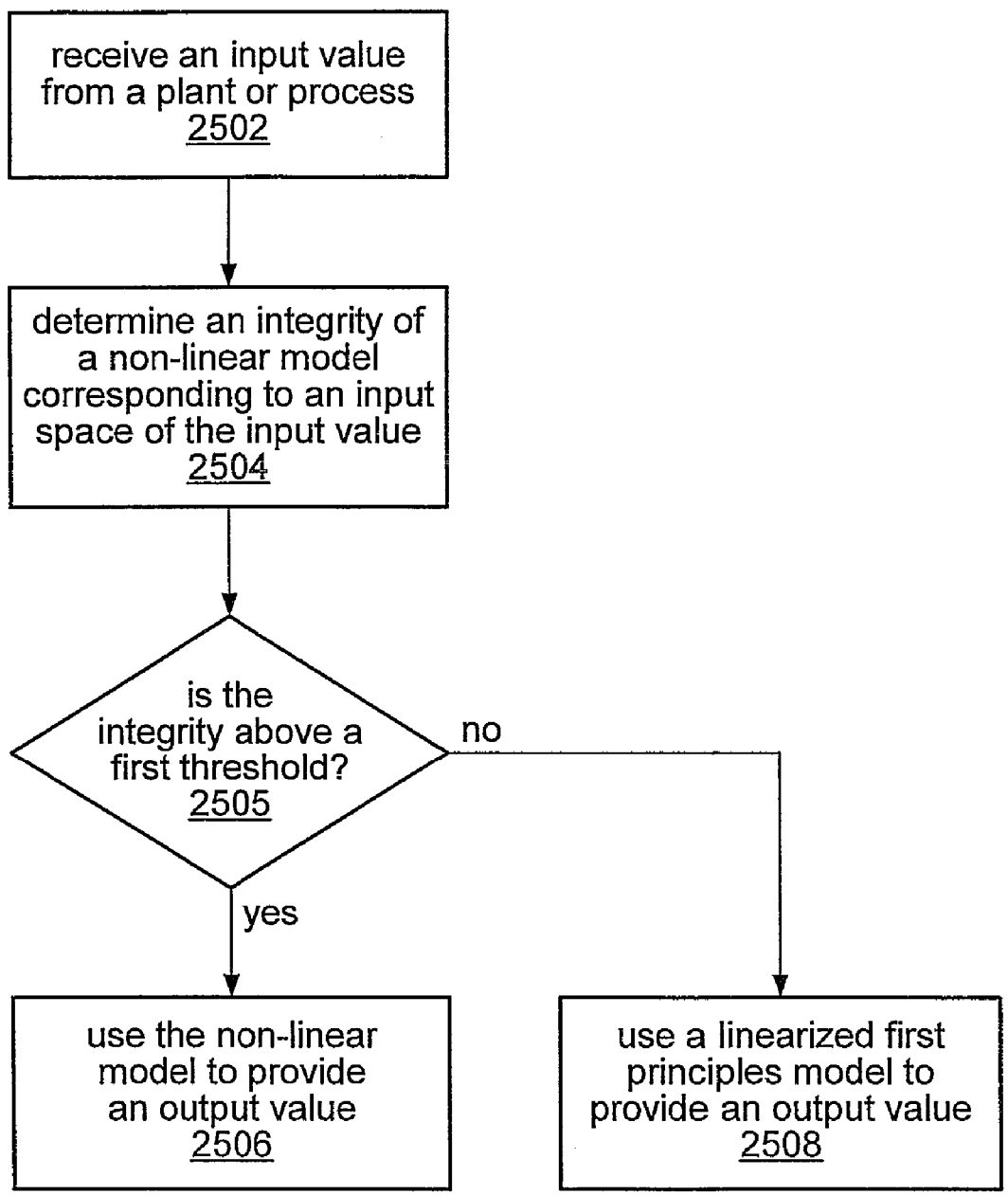
FIG. 25 is an exemplary block diagram which illustrates a method for using a linearized first principles model according to one embodiment.

FIG. 25—Method for Using a Linearized First Principles Model

FIG. 25 is a block diagram illustrating an exemplary method for using a linearized first principles model. The method shown in FIG. 25 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, the method may operate as follows.

In 2502, an input value may be received from the plant or process. The input value may be the value of a particular volume, temperature, flow rate, and/or other characteristic or value associated with the plant or process. For example, the input value may be an initial temperature of a chemical entering a reaction vessel in the plant. Note that the above described inputs are exemplary only and that other inputs/values are envisioned (e.g., those described above, among others).

In 2504, the method may determine an integrity of the non-linear model corresponding to a local input space or domain of the input value. In some embodiments, the integrity of the non-linear model may be based on the accuracy of the non-linear model in the local input space or domain of the input value, i.e., in a region within which the input value is found. Alternatively, or additionally, the integrity of the non-linear model may be based on the local input space of the input value. For example, as described above, the non-linear model may have high integrity where the input value is within the space that the non-linear model was trained (e.g., the region 2402). In areas outside of the trained space, the non-linear model may have a lower integrity. In some embodiments, there may be a local input space just outside of the training data where the non-linear model may retain some accuracy/integrity (e.g., the region 2404), and an outside area where the integrity may be much lower (e.g., the region 2406).

In 2506, if the integrity is above a first threshold (as determined by 2505), the non-linear model may be used to provide a first output value. In some embodiments, the non-linear model may utilize an empirical representation of the plant or process, e.g., a neural network or support vector machine, to provide the first output value. In other words, the non-linear model may be a trained model, e.g., a trained steady-state model, as described above. As indicated above, the threshold may depend on the accuracy of the model and/or the local input space of the input value (among others). For example, following the descriptions above, the non-linear model may be used if the local input space is inside the region 2402 and/or the region 2404, as desired.

In 2508, if the integrity is below the first threshold, the linearized first principles model may be used to provide a second output value. In some embodiments, the linearized first principles model may utilize an analytic representation of the plant or process to provide the second output value. Additionally, in one embodiment, the analytic representation of the plant or process may be independent of the empirical representation of the plant or process. Said another way, the linearized first principles model may be based on a linearization of the first principles model and not the training data used by the non-linear model.

Following the descriptions above, the linearized first principles model may be used when the local input space of the input variable is outside of the region 2402 and/or the region 2404. More specifically, where the method uses one threshold, the non-linear model may be used inside the region 2402 and the linearized first principles model may be used outside of the region 2402. Alternatively, the non-linear model may be used inside of the region 2404 and the linearized first principles model may be used outside of that region. In other words, in some embodiments, the first threshold may be the boundary of the region 2402 and/or the region 2404. In embodiments where a plurality of thresholds are used (e.g., two thresholds), the non-linear model may be used above the first threshold (e.g., in the region 2402), the first principles model may be used above the second threshold but below the first threshold (e.g., in the region 2404), and the linearized first principles model may be used below the second threshold (e.g., in the region 2406).

Thus, according to various embodiments, a linearized first principles model may be used to model the behavior of a plant or process.

What is claimed is:

1. A predictive system for predicting operation of a plant or process, comprising:
    a non-linear model comprising:
        an empirical representation of the plant or process;
        a first input operable to receive an input value; and
        a first output operable to provide a first output value;
        wherein the non-linear model is operable to receive the input value and generate the first output value using the empirical representation of the plant or process;
    a linearized first principles model comprising:
        an analytic representation of the plant or process, wherein the analytic representation of the plant or process is independent of the empirical representation;
        a second input operable to receive the input value; and
        a second output operable to provide a second output value;
        wherein the linearized first principles model is operable to receive the input value and generate the second output value using the analytic representation of the plant or process;
    a domain analyzer operable to determine whether the input value falls within a region of space where the non-linear model has an integrity that is less than a first threshold; and
    a controller operable to:
        use the non-linear model when the integrity is above the first threshold; and
        use the linearized first principles model when the integrity is below the first threshold;
    wherein the first output value and/or the second output value is usable to manage the plant or process.

2. The system of claim 1, wherein the linearized first principles model comprises a linearization of a first principles model.

3. The system of claim 1, wherein the linearized first principles model comprises a local linearization of a first principles model local to the input value.

4. The system of claim 1, wherein the linearized first principles model comprises a global linearization of a first principles model.

5. The system of claim 4, wherein the global linearization is based on the range of previous input values.

6. The system of claim 1, wherein the domain analyzer is further operable to determine whether the input value falls within a region of local input space where the non-linear model has an integrity that is less than a second threshold, and wherein the second threshold is lower than the first threshold.
    wherein the controller is operable to:
        use the non-linear model when the integrity is above the first threshold;
        use a first principles model when the integrity is above the second threshold and below the first threshold; and
        use the linearized first principles model when the integrity is below the second threshold.

7. The system of claim 1, wherein the non-linear model comprises a steady-state model.

8. The system of claim 1, wherein the non-linear model comprises:
    a neural network; or
    a support vector machine.

9. A method for predicting operation of a plant or process, comprising:
    receiving an input value from the plant or process;
    determining an integrity of a non-linear model corresponding to a local input space of the input value, wherein the non-linear model comprises an empirical representation of the plant or process;
    if the integrity is above a first threshold, using the non-linear model to provide a first output value; and
    if the integrity is below the first threshold, using a linearized first principles model to provide a second output value, wherein the linearized first principles model comprises an analytic representation of the plant or process, and wherein the analytic representation of the plant or process is independent of the empirical representation of the plant or process;
    wherein the first output value and/or the second output value is usable to manage the plant or process.

10. The method of claim 9, wherein the linearized first principles model comprises a linearization of a first principles model.

11. The method of claim 9, wherein the linearized first principles model comprises a local linearization of a first principles model local to the input value.

12. The method of claim 9, wherein the linearized first principles model comprises a global linearization of a first principles model.

13. The method of claim 12, wherein the global linearization is based on the range of previous input values.

14. The method of claim 9, wherein the method further comprises:

using the non-linear model when the integrity is above the first threshold and a second threshold, wherein the second threshold is lower than the first threshold;

using a first principles model when the integrity is above the second threshold; and using the linearized first principles model when the integrity is below the second threshold.

15. The method of claim 9, wherein the non-linear model comprises a steady-state model.

16. A memory medium comprising program instructions for predicting operation of a plant or process, wherein the program instructions are executable by a processor to:

receive an input value from the plant or process;

determine an integrity of a non-linear model corresponding to a local input space of the input value, wherein the non-linear model comprises an empirical representation of the plant or process;

if the integrity is above a first threshold, use the non-linear model to provide a first output value; and if the integrity is below the first threshold, use a linearized first principles model to provide a second output value, wherein the linearized first principles model comprises an analytic representation of the plant or process, and wherein the analytic representation of the plant or process is independent of the empirical representation of the plant or process;

wherein the first output value and/or the second output value is usable to manage the plant or process.

17. The memory medium of claim 16, wherein the linearized first principles model comprises a linearization of a first principles model.

18. The memory medium of claim 16, wherein the linearized first principles model comprises a local linearization of a first principles model local to the input value.

19. The memory medium of claim 16, wherein the linearized first principles model comprises a global linearization of a first principles model.

20. The memory medium of claim 16, wherein the program instructions are further executable to:

use the non-linear model when the integrity is above the first threshold and a second threshold, wherein the second threshold is lower than the first threshold;

use a first principles model when the integrity is above the second threshold; and use the linearized first principles model when the integrity is below the second threshold.

\* \* \* \* \*